US011770425B2

(12) United States Patent
Deng et al.

(10) Patent No.: US 11,770,425 B2
(45) Date of Patent: Sep. 26, 2023

(54) DYNAMIC MANAGEMENT OF PRESENTERS OF A COMMUNICATION SESSION

(71) Applicant: MICROSOFT TECHNOLOGY LICENSING, LLC, Redmond, WA (US)

(72) Inventors: Ying Deng, Sammamish, WA (US); Raghu Chinagudabha, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/564,956

(22) Filed: Dec. 29, 2021

(65) Prior Publication Data
US 2023/0208898 A1 Jun. 29, 2023

(51) Int. Cl.
*H04L 65/4038* (2022.01)
*G06F 3/0482* (2013.01)
(Continued)

(52) U.S. Cl.
CPC ........ *H04L 65/4038* (2013.01); *G06F 3/0482* (2013.01); *G06F 3/0484* (2013.01);
(Continued)

(58) Field of Classification Search
CPC ................ G06F 3/0482; G06F 3/0484; G06Q 10/06393; H04L 12/1822; H04L 12/1827; H04L 65/4038
See application file for complete search history.

(56) References Cited

U.S. PATENT DOCUMENTS 6,901,394 B2   5/2005   Chauhan et al.
7,092,821 B2   8/2006   Mizrahi et al.
(Continued)

OTHER PUBLICATIONS

Steven, John, "How to use the 'raise hand' feature in Zoom on a computer or mobile device", Retrieved from: https://www.businessinsider.com/how-to-raise-hand-in-zoom?IR=T#:~:text=During%20a%20meeting%2C%20click%20on,button%20labeled%20%22Raise%20Hand.%22&text=Your%20digital%20hand%20is%20now%20raised., Nov. 19, 2020, 10 Pages.

(Continued)

*Primary Examiner* — Thomas J Dailey
(74) *Attorney, Agent, or Firm* — Scott Y. Shigeta; Newport IP, LLC

(57) ABSTRACT

A system for managing a communication session between a number of participants is provided. The system can analyze activity of each participant and generate recommendations on the communication flow of a meeting. For instance, the system can analyze user activity and other contextual data for each user to determine a recommended speaking arrangement for the participants. The recommendations can be presented to a moderator who can then utilize the recommendations to control the flow of the meeting. Inputs received from the moderator can modify speaking and viewing permissions to emphasize or deemphasize displays and audio of individual participants. In some configurations, the recommendations can be utilized by a system to automatically control permissions for each participant for the purposes of controlling communication and flow of an event, such as an online meeting.

20 Claims, 15 Drawing Sheets

(51) Int. Cl.
*G06Q 10/0639* (2023.01)
*H04L 12/18* (2006.01)
*G06F 3/0484* (2022.01)

(52) U.S. Cl.
CPC ... *G06Q 10/06393* (2013.01); *H04L 12/1822* (2013.01); *H04L 12/1827* (2013.01)

(56) References Cited

U.S. PATENT DOCUMENTS

| | | | |
|---|---|---|---|
| 8,316,089 B2* | 11/2012 | Thakkar | H04N 21/4312 709/204 |
| 9,024,993 B2 | 5/2015 | Hession et al. | |
| 9,026,476 B2* | 5/2015 | Bist | G06N 5/04 706/10 |
| 9,148,627 B2 | 9/2015 | Anderson et al. | |
| 9,305,465 B2 | 4/2016 | Hyndman et al. | |
| 9,386,270 B2 | 7/2016 | Griffin et al. | |
| 9,426,421 B2* | 8/2016 | Balasaygun | H04L 12/1813 |
| 9,445,055 B2* | 9/2016 | Chaudhry | H04N 7/147 |
| 9,674,243 B2 | 6/2017 | Bader-natal et al. | |
| 10,438,172 B2* | 10/2019 | Rangan | G06Q 10/1095 |
| 10,567,448 B2 | 2/2020 | Bader-natal et al. | |
| 11,122,240 B2* | 9/2021 | Peters | G06V 20/41 |
| 11,128,484 B2 | 9/2021 | Fahrendorff et al. | |
| 2006/0195354 A1* | 8/2006 | Borovoy | G06Q 10/06398 705/7.42 |
| 2015/0049162 A1* | 2/2015 | Kurupacheril | H04N 5/23238 348/14.08 |
| 2015/0154291 A1 | 6/2015 | Shepherd et al. | |
| 2016/0072862 A1 | 3/2016 | Fields et al. | |
| 2016/0285921 A1 | 9/2016 | Savostiyanov et al. | |
| 2018/0241882 A1 | 8/2018 | Lee et al. | |
| 2020/0320478 A1 | 10/2020 | Crawford et al. | |
| 2021/0176429 A1 | 6/2021 | Peters et al. | |
| 2022/0270612 A1* | 8/2022 | Ahmed | G06Q 10/063118 |
| 2022/0321703 A1* | 10/2022 | Harris | G06V 40/176 |

OTHER PUBLICATIONS

"International Search Report and Written Opinion issued in PCT Application No. PCT/US22/047786", dated Jan. 30, 2023, 18 Pages.

Samrose, et al., "CoCo: Collaboration Coach for Understanding Team Dynamics during Video Conferencing", In Proceedings of the ACM on Interactive, Mobile, Wearable And Ubiquitous Technologies, vol. 1, Issue 4, Dec. 2017, 24 Pages.

* cited by examiner

DYNAMIC MANAGEMENT OF PRESENTERS OF A COMMUNICATION SESSION

BACKGROUND

There are a number of different types of systems that allow users to communicate. For example, some systems allow people to collaborate by sharing content using video streams, shared files, chat messages, emails, etc. Some systems provide user interface formats and permission settings that allow select users to share content with an audience. Such systems can provide specific sets of permissions that allow users to take specific roles, such as a presenter, audience member, a moderator etc.

Although some systems can provide specific sets of permissions for users to take on certain roles, such systems have a number of drawbacks. For instance, when an audience member wishes to become a presenter, that person may have to submit a request to become a meeting presenter. In such systems, the flow of a meeting may not be optimized, as some participants may dominate a meeting, or some people may not have the right timing or initiative to become a presenter. In other situations, some participants may not have appropriate permissions to become a presenter. In such scenarios, the flow of a meeting may not be optimized as some content may be repetitive or time may not be optimally allocated to the right presenters. Some participants having appropriate backgrounds for certain topics may not have an opportunity to become presenters, and time may be allocated to people who are not best fitted for a particular discussion. Moreover, without proper coordination of each potential presenter, a meeting can lag or have downtime in discussions which is not optimal for the participants nor is it optimal in the use of the computing resources. This may lead to a number of inefficiencies in the use of a computing system in that meetings may be prolonged or more meetings may be needed to communicate the necessary information.

The above-described shortcomings can also be exacerbated when a hybrid work model is involved. A hybrid work model involves situations where an online meeting involves on-premises participants and on-online participants. Some studies have shown that a meeting with all members on-premises or all remote members are more effective compared to meetings with hybrid participation. Also, the on-premises members have in-room dynamics due to their physical proximity which encourages participation which is good for the flow of a meeting. But when you have a set of remote team members, it is important to bring in that same in-room dynamics to them as well so that the remote participant's level of engagement could be at par with that of in-room participants.

SUMMARY

The techniques disclosed herein provide a system for managing a communication session between a number of participants. The system can analyze activity of each participant and generate recommendations on the communication flow of a meeting. For instance, the system can analyze user activity and other contextual data for each user to determine a recommended speaking arrangement for the participants. The recommendations can be presented to a moderator who can then utilize the recommendations to control the flow of the meeting. Inputs received from the moderator can modify speaking and sharing permissions, which can also include controlling the display and audio level of individual participants. In some configurations, the recommendations can be utilized by a system to automatically control permissions for each participant for the purposes of controlling communication within an event, such as an online meeting.

In some configurations a system can generate a user interface format that includes a time ordered queue with identifications of system recommendations of a priority for each recommended speaker. The user interface format can also include an ordered queue based on a time stamp and a system priority recommendation based on respective a participant's familiarity to the topic, historical or potential impact on the effectiveness of a meeting having a particular topic, or individual participation score. The time stamp can be based on the timing of any type of input indicating an intent to speak, e.g., a user input on an input device or a gesture captured by video camera or an audio device. The input can include, but is not limited to, video data showing a person raising a hand raise, video data showing a movement indicating a person's intent to speak, audio data containing spoken words or a vocal request to speak, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
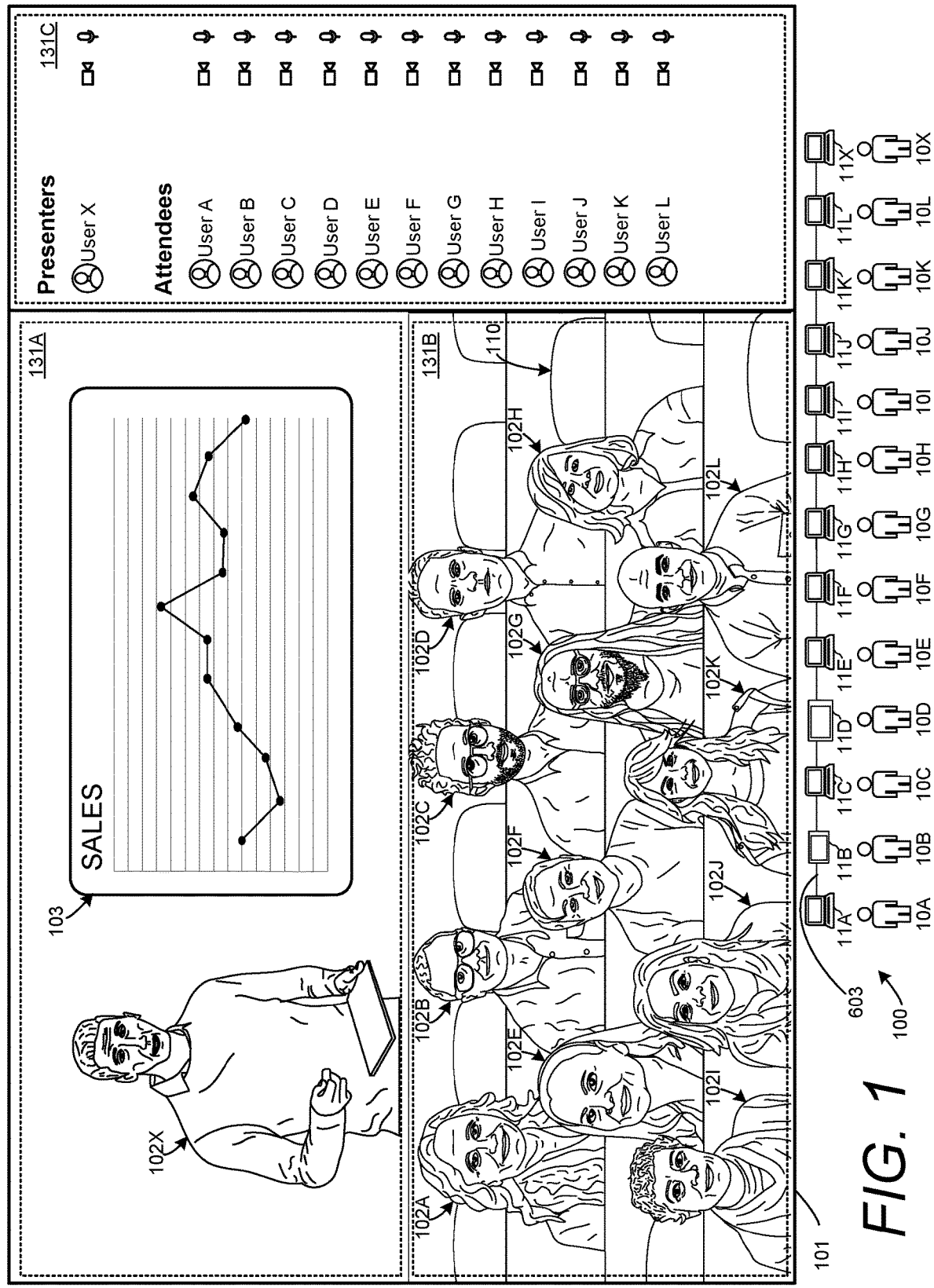
FIG. 1 is a block diagram of a system and an example of a participant user interface for a multi-user communication session.

FIG. 1 is a block diagram of a system 100 and an example user interface 101 for providing a communication session for a number of users 10 associated with client computers 11. This example user interface 101A can be displayed to a number of users 10 of a communication session 604. Each device 11 can individually display a user interface 101 comprising a primary presentation area 131A, an attendee image region 131B, and an attendee status region 131C. The primary presentation region 131A can include a display of presentation content 103 and a rendering of a presenter 102X utilizing a computing device 11X. The system can store permission data that allows the presenter 102X to control the display of the content 103 on the user interface 101A of each user. The attendee image region 131B can include individual renderings 102A-102L of the video streams of a plurality of participants 10A-10L individually communicating from remote devices 11A-11L. The attendee status region 131C can show a status of each participant 10A-10L.

As shown, the individual renderings 102A-102L of the attendee image region 131B can be positioned relative to a seating configuration of a virtual environment 110. For exemplary purposes, this configuration can be referred to herein as a Together Mode region 131B. This example is provided for illustrative purposes, as the virtual environment 110 can be in any form, such as an office, meeting room, auditorium, stadium, etc. Each rendering 102A-102L can also be in a grid arrangement without a display of a seating configuration. The user interface shown 101 in FIG. 1 can be generated for display at any one of the devices and can display any number of participants.

In the example shown in FIG. 1, the presenter 102X has permissions to control the display of the content 103. The system can also be configured to receive a request from each of the attendees 102A-102L to become the presenter. When a user is promoted to a presenter role, the system grants that person permissions to control the display of content 103 in the presentation region 131A and also show a rendering of themselves in the presentation region 131A. A request to become a presenter can be in the form of a manual input from a participant. A request may also be detected by the analysis of video data or audio data from each attendee. For instance, video data depicting a user performing a gesture such as, but not limited to, a hand raise or a video indicating that they are about to speak, can be detected by the system 100 and utilized to initiate a request for that person to become a presenter. In addition, audio data having audio signals indicating that a person has a desire to speak can also be utilized to initiate a request for that person to become presenter.

In some configurations, a participant may have permissions to participate as a moderator of a meeting. A moderator can control the permissions of other users and promote any audience members to become a presenter or demote presenters to become audience members. The moderator can also control the order in which the participants can become presenters and/or allow a system to transition a user interface and permissions for a queue of presenters at designated times. In some configurations, the system presents a moderator user interface.

In some configurations, the moderator user interface may display recommendations for a moderator. For example, the moderator user interface can display an ordered list of presenters. The system can then use the ordered list of presenters to grant permissions for each subsequent person in the queue as each presenter completes their presentation. The system can give the moderator permission to control when a person is to transition out of a presenter role and when to allow the next person in the queue to participate as a presenter. The system can give the moderator permission to change the order of the presenters in the queue.

Figure 2A:
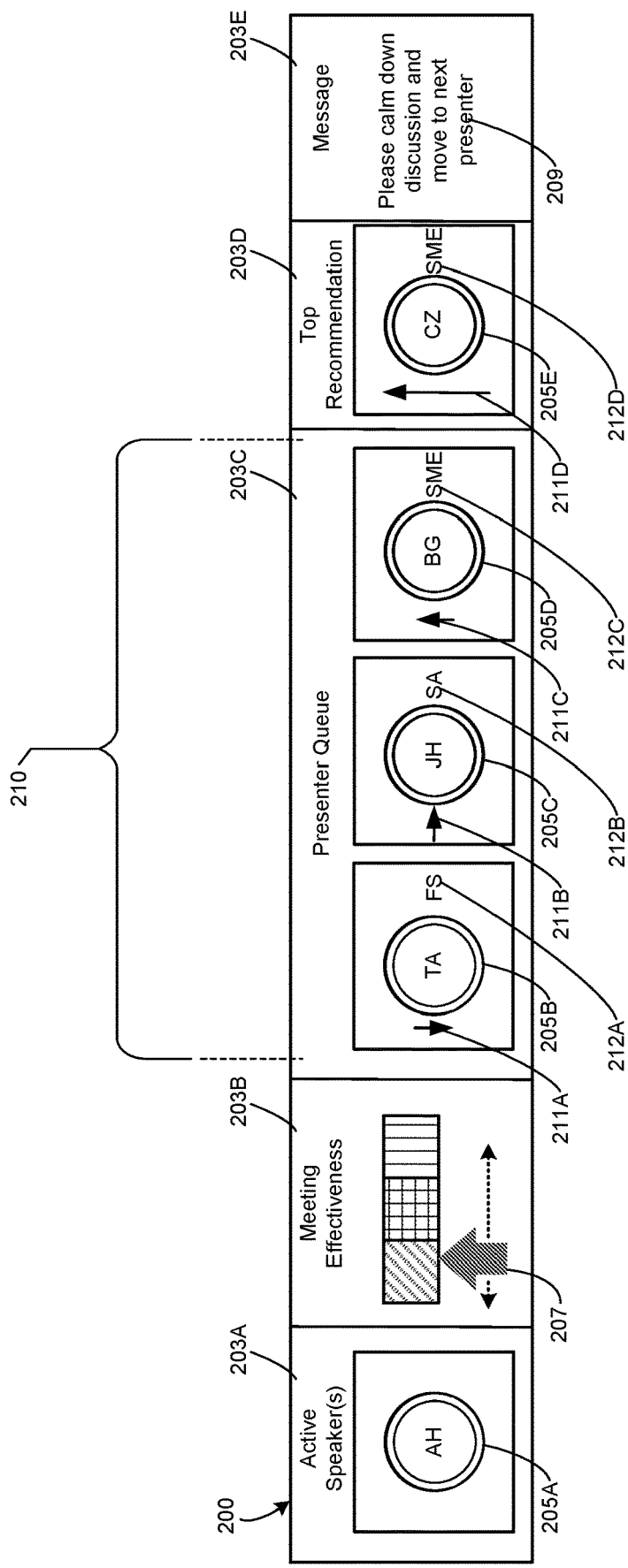
FIG. 2A is an example moderator user interface for providing dynamic management of presenters of a communication session.

FIG. 2A shows an example of a moderator user interface 200. In this example, the moderator user interface 200 includes a number of display areas 203 including a first display area 203A for identifying active presenters. This first display area can include graphical representations 205 or identifiers of participants who are currently granted presentation rights. In this example, the system has granted a first user 205A presentation rights. The moderator user interface 200 can also include a second display area 203B for indicating the effectiveness of a meeting. This display area may include a graphical element 207 that visually conveys a value indicating the effectiveness of a meeting. In this example, a bar 108 can include three colors, e.g., red, yellow and green. The graphical element 207 can then slide from the left side, which can indicate that a meeting has a low effectiveness, e.g., over the red color, to the right over other colors, e.g., yellow and green, which can respectfully indicate a medium level of effectiveness or a high level of effectiveness. Although this example shows the use of a color bar and graphical indicator, any graphical element for conveying an effectiveness value, including text, may be utilized in this display area. A number of methods of determining a value quantifying the effectiveness of a meeting is described in more detail below.

The moderator user interface can also include a second display area 203C comprising a presentation queue 210. The presentation queue can include an ordered list of representations 205 of meeting participants. The order of the representations 205 can be arranged according to the order in which each person is scheduled to present content to the other meeting participants. In this example, a second user 205B, third user 205C, and a fourth user 205D are respectively queued to provide a presentation. Thus, when the first user 205A completes his or her presentation, the second user 205B would be granted access to provide a presentation by receipt of permissions allowing the second user to present content and to provide video and/or audio to other meeting participants.

The presentation queue 210 can be configured with other contextual indicators. For example, in association with the representation 205B of the second user, the system displays a first recommendation element 211A for providing notice of a recommendation to change the order of the associated individual in the presentation queue. In this example, the first recommendation element 211A is in the form of an arrow pointing in a downward direction to indicate that the associated user 205B should be moved to a lower position within the queue. In association with the representation 205C of the third user, the system displays a second recommendation element 211B for providing notice of a recommendation to change the order of the associated individual in the presentation queue. In this example, the second recommendation element 211B is in the form of an arrow pointing in a sideways direction to indicate that the associated user 205B should not be moved to another position within the queue. In association with the representation 205D of the fourth user, the system displays a third recommendation element 211C for providing notice of a recommendation to change the order of the associated individual in the presentation queue. In this example, the third recommendation element 211C is in the form of an arrow pointing in a down direction to indicate that the associated user 205D should be moved to a higher position within the queue. These recommendations are changing a position of a user within the queue can be generated by the system using a number of different factors. Some examples utilizing various forms of contextual information are described in more detail below.

Also shown in FIG. 2A, the presentation queue 210 can be configured with other contextual indicators to explain a reason for the recommendation and/or characteristics of each participant included in the queue. For example, in association with the representation 205B of the second user, the system displays a first context indicator 212A for providing characteristics of the associated user and/or reasons for the recommendation of changing order of the associated user. In this example, the first context indicator 212A indicates that the user is a frequent speaker ("FS"). This information provides a notification to the moderator that the reason for the change in the position of this user is because the associated user has already presented their information and that additional information from this user may provide diminished returns. In association with the representation 205C of the third user, the system displays a second context indicator 212B for providing characteristics of the associated user and/or reasons for the recommendation of maintaining the order of the associated user. In this example, the second context indicator 212A indicates that the user is a silent attendee ("SA"). This information can help notify the moderator the reason for maintaining the position of this user in the queue. In association with the representation 205D of the fourth user, the system displays a third context indicator 212C for providing characteristics of the associated user or reasons for the recommendation of changing order of the associated user. In this example, the third context indicator 212C indicates that the user is a subject matter expert ("SME"). This information can help notify the moderator that the reason for the change in the position of this user in the queue is because that this user has knowledge related to a topic being discussed in the meeting. As described in more detail below, the recommendation elements and/or the context indicators can be updated in real time as the topic of the discussion changes and/or when the meeting effectiveness changes.

Also shown in FIG. 2A, the moderator user interface 200 can include a fourth display area 203D comprising one or more top recommendations. The top recommendations are generated by the system by analyzing a number of factors from contextual information to identify a presenter that is not listed in the presenter queue, e.g., a presenter that did not provide an input indicating an interest to speak. In this example, the fourth display area 203D shows a representation 205E of a fifth user. In this example, the fifth user has not provided an input indicating a desire to speak. This section of the user interface only shows users who have not provided an input indicating a desire to speak. This section of the user interface also shows potential speakers that the system identifies based on one or more factors described below. In this specific example, the user with initials CZ is recommended as a top speaker. Also in this example, the system displays a fourth recommendation element 211D for providing notice of a recommendation to change the order of the associated individual in the presentation queue. This specific recommendation allows the moderator to place the associated user within any position of the queue, including the first position. In addition, this section of the user interface also includes additional characteristics of the recommended user, e.g., that the user is a subject matter expert ("SME"), a silent attendee, etc.

Also shown in FIG. 2A, the moderator user interface 200 can also include a fifth display area 203E comprising a message. The message can provide a recommendation of an action for the moderator to take. For instance, the message may include instructions for the timing in which the moderator is to introduce a new speaker or transition permissions to the next speaker in the queue. The message may also provide instructions on actions to take with respect to the attendees, e.g., tone down the conversation, switch topics, etc.

Figure 2B:
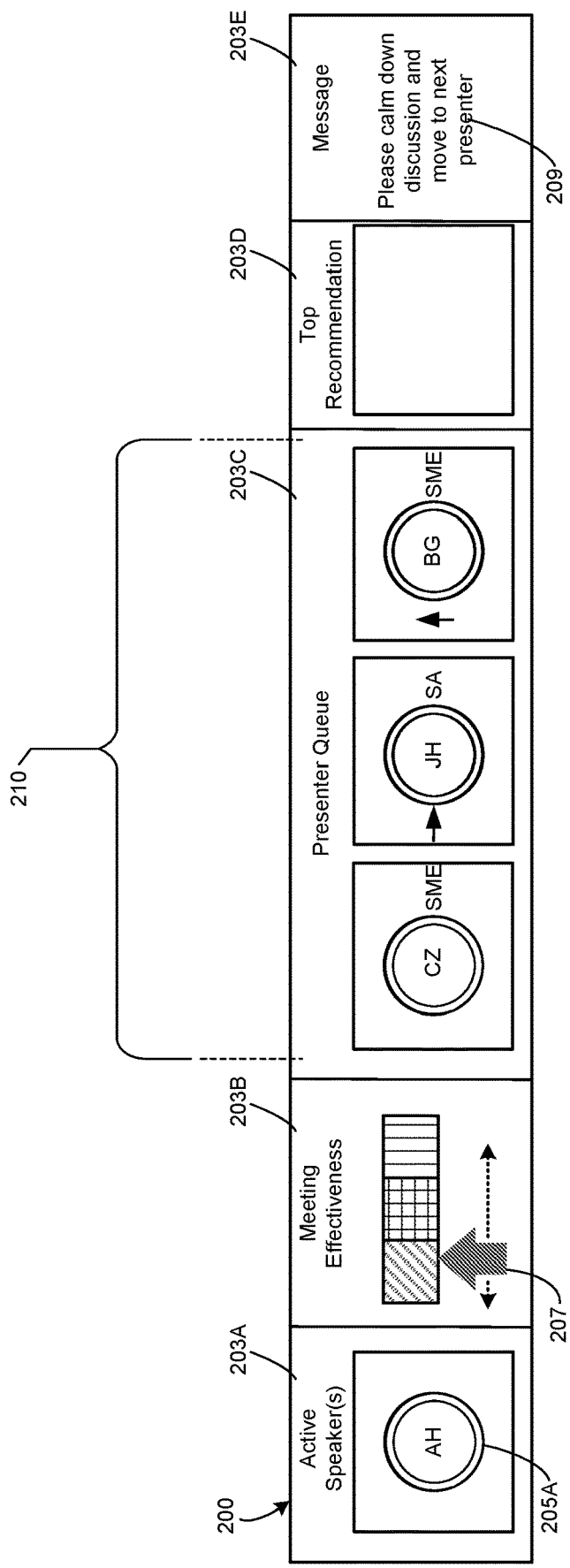
FIG. 2B is an example of a modified version of a moderator user interface for providing dynamic management of presenters of a communication session.

FIG. 2B shows a modified version of a moderator user interface 200 which includes a different ordering of the presenters in the presenter queue. Such modifications can be generated in response to input data defining a confirmation of a recommendation. The confirmation can be validated by a computing system or the confirmation can be generated from a user input. A computing system can modify the moderator user interface when one or more recommendations meets one or more criteria. For instance, if one or more scores exceeds a threshold, e.g., an individual participation score or an individual recommendation score, the system may change an order of the queue for participants associated with those scores. In other embodiments, a user input can identify one or more participants, e.g., TA, JH, BG, CZ, in response to recommendations displayed within the moderator user interface shown in FIG. 2A.

Figure 3:
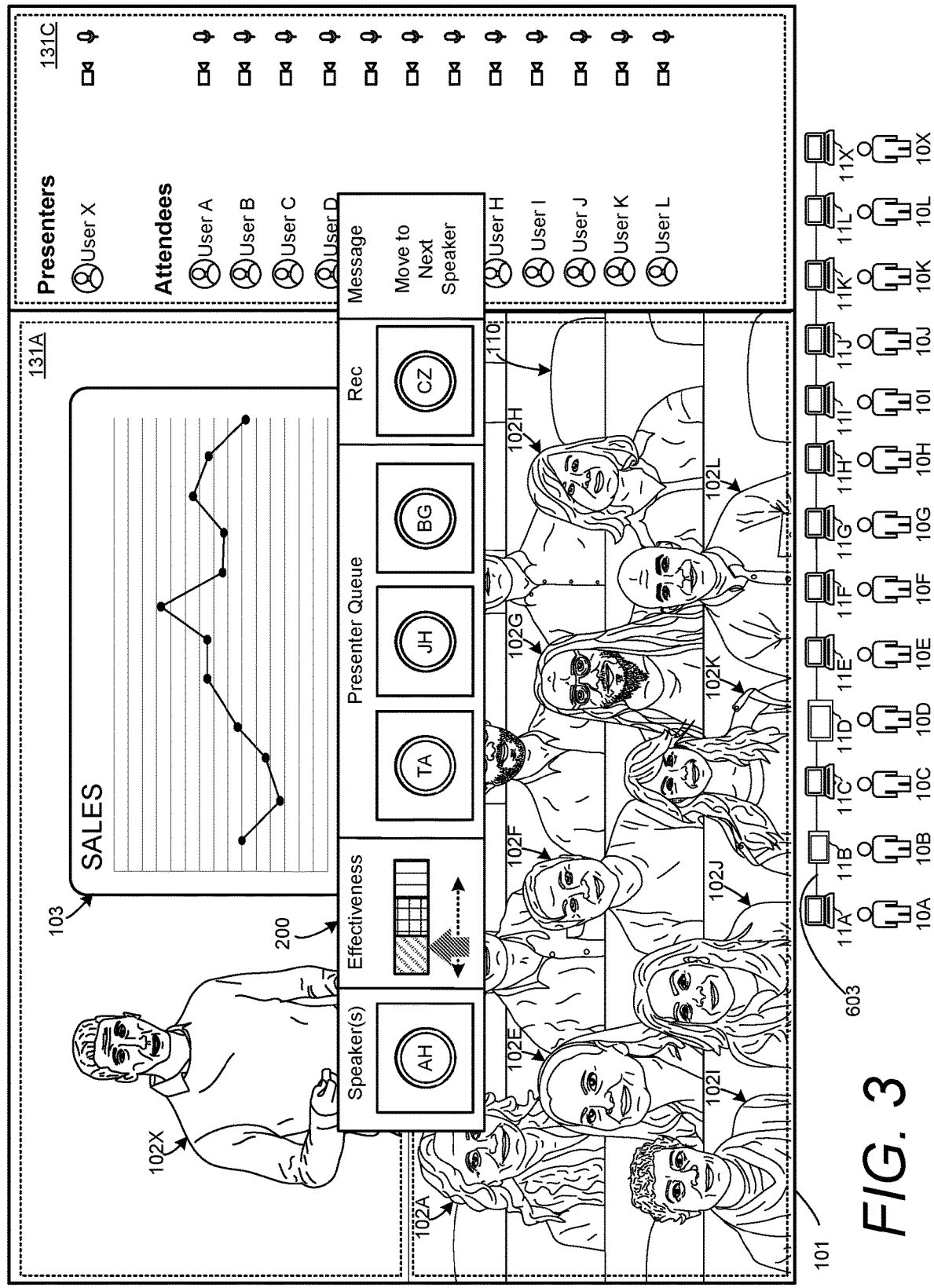
FIG. 3 is an example of a participant user interface configured with a moderator user interface.

The moderator user interface 200 can be presented to the moderator in a number of formats. In some configurations, the system can display the moderator user interface 200 to users having moderator permissions. As shown in FIG. 3, the moderator user interface 200 can be displayed concurrently with the participant user interface 101. The moderator can then use one or more inputs, including touch inputs, pointer inputs, voice inputs or gesture inputs, to change the order of the presenters in the presenter queue.

As summarized above, the system can analyze contextual data from a number of different resources to determine a meeting effectiveness level, recommended changes for a presenter queue and top recommendations for presenters. A dynamic meeting moderation system uses these determined values and recommendations to assist a meeting organizer, which can be an active speaker, in moderating the meeting. This enables a system to dynamically encourage remote participation. For example, even if a moderator can't see every aspect of remote user, the techniques disclosed herein can raise awareness of remote speaker's intention to speak, e.g., flash the intended speaker's image, increase his/her volume settings automatically to an appropriate level etc.

The system can also send a notification to the meeting organizer to actively moderate the conversation flow to allow remote speaker to chime in. The system can also provide dynamic interactive enhancement. For example, the system can present an ordered list of names to assist the meeting organizer to find the right online speaker. In large online meetings, when a question is raised to the audience, the system can display an ordered list of names, e.g., a queue, to the people who asked the question. The person who raised the question can use the list to seek answers.

The order in the queue is determined based on an individual recommendation score calculated using a weighted sum or any combination of the following factors: the timing in which a user provided an input to speak, a topic familiarity score, and an individual participation score.

The timing in which a user provided an input to speak can be based on a time at which the remote attendee raised his/her hand. When there are multiple people raising their hands, the order can be determined by a time of the remote attendee raising their hand. For instance, if a first person who raises their hand before a second person, the first person would receive a higher timing score than the second person. The timing score can be utilized to determine the individual recommendation score.

The topic familiarity score can be determined by an analysis module. As described in more detail below, the analysis module uses a topic of a meeting and compares that topic with each attendee's personalized user model to make recommendations. For instance, the system may analyze documentation, conversation transcripts, chat messages or any other shared information in a meeting to determine a topic of the meeting. That determined topic compared against a personalized user model, which is learned from the user's historical meeting participation data and professional experience data. The historical meeting participation data can include any information pertaining to a previous meeting or any documents that a participant has generated or reviewed in the past. The professional experience data can come from social media sites, e.g., LinkedIn, or any other database or resource that provides any information regarding a person's career.

In some configurations, the individual participation score can be based on any combination of the following factors. One factor can be based on the number of attempts a user has made to speak. This can be based on video or audio data where a user has started to speak but was interrupted, didn't complete a sentence, didn't complete a presentation, etc. The number of attempts can also be based on a number of times a person raised their hand, provided an in-application input to speak, etc. The individual participation score can increase or decrease based on the number of attempts user has made to speak.

Another factor that can be used to determine the individual participation score can include a duration of participation. This can include a duration in which a person has talked in a meeting, or it can be based on a duration in which the user attended parts of a meeting. Trends in a number of duration measurements can also be utilized to determine the individual participation score. For instance, if a person has multiple durations over time and each duration increases or decreases over time, those trends can cause the individual participation score to increase or decrease. In some configurations, an individual participation score can increase or decrease if a person is found to talk beyond a predetermined duration. The general philosophy is that if a person is speaking too much then it can detract from the effectiveness of a meeting.

Another factor that can be used to determine the individual participation score can include a level of confidence for particular user. The level of confidence can be based on an analysis of video data or audio data that can analyze tone or posture. For instance, a person who is looking into the camera and has a fixed gaze while speaking can have an increased level of confidence. Inflections in a person's voice can also be used to determine a level of confidence. For instance, increased or decreased tone changes can be used to determine a confidence score, e.g., a level of confidence. An increase or decrease in the level of confidence can cause an increase or decrease of the individual participation score.

Another factor that can be used to determine the individual participation score can include a level of interactivity from an individual in a team. For instance, if a particular person speaks and the audience for other people react positively to that input, that person's individual produce patient score can increase. The system can analyze video data by analyzing gestures and facial expressions to determine audience reaction, whether positive or negative, to a person's input to a meeting. The input can include a presentation of content whether vocal or written. Audience reactions can be based on audio signals such as clapping or positive or negative remarks, all of which can be used to increase or decrease an individual participation score for a person sharing content.

The individual participation score individual participation score can be utilized for providing instructions to a moderator. In some configurations, the moderator can use those instructions to encourage attendees with background knowledge but tend to be quiet in remote settings. The individual participation score can be determined using a number of different factors. In some configurations, the individual produce patient score can be determined using a first set of factors for users who are participating live in an in-room setting, and a second set of factors for users who are remote.

In some configurations, the system can also determine a meeting effectiveness score. The meeting effectiveness score can quantify the effectiveness of a group of individuals as a whole. For instance, if the meeting has little discussion or conversation lags with respect to pace or quantity or quality of shared content with respect to a topic, the system may increase or decrease in meeting effectiveness score. In some configurations, the meeting effectiveness score can be a weighted average or a combination of the following parameters.

One of the parameters that can be used to determine a meeting effectiveness score includes a score quantifying the progress of an agenda. The progress can be based on a level of completion of an agenda. For instance, if an agenda has five items and the meeting participants have only discussed three items with only 20% of the time remaining, the meeting effectiveness score can drop from such activity. However, if the meeting participants complete all five agenda items early in the meeting, the meeting effectiveness score can increase. The progress can be based on an analysis of audio and video data or any shared content to determine whether a particular agenda item has been completed. Users can also provide inputs to indicate completion of a particular agenda item.

Another parameter that can be used to determine the meeting effectiveness score includes a team participation score. In some configurations, the team participation score can be a combination, such as the average or sum, of individual participation scores of all or a select group of participants. The system does not require the team participation score to be high or uniform to determine that a meeting is effective. In some configurations, a team participation variance can be determined in conjunction with, or as part of, the meeting effectiveness score.

In some configurations, the system can use a target participation score for each meeting based on the meeting type. For instance, an all hands meeting where there is only one speaker and many audience members, a system may determine a first target participation score. However, for a small group meeting where many people are expected to participate, the system may determine a second target participation score. In other examples, a meeting type can include a meeting intended for sharing information. This can include how many meetings or groupwide meetings. In this example, a meeting may be determined to have a high level of effectiveness when one person is talking, and many people are silent. However, the effectiveness of this type of meeting may be lower when many people are talking, which is against the main objective to have one person share ideas to others.

Another meeting type can include knowledge improvement meetings, such as training sessions. This type of meeting may have a high level of effectiveness when one person is sharing ideas with others and there is a threshold level of interaction from the individuals. Thus, a system may determine that a meeting is highly effective when the audience does have some level of interaction and questions. In yet another example, a meeting type can include a status or check-in meeting. The system can determine a high level of effectiveness when the system detects from audio data or video data that objectives are set and objectives are made. This can include questions that are answered with decisions. The decisions can be detected based on a user input or a detection of a particular answer to a specific question or goal. In this type of meeting, a meeting may be determined as effective when objectives are made and when there is a threshold level of interaction. In yet another example, a meeting type can include a strategic decision-making meeting. Similar to the status meeting, a meeting can be determined as an effective meeting when decisions are made for a particular objective or set of objectives. However, in this type of meeting, a threshold level of interaction, e.g., a threshold level of communication between participants, may not be needed.

The target participation scores can be used as thresholds to determine if a meeting is effective or not effective based on the meeting effectiveness score. For instance, in the meeting effectiveness indicator of the moderator user interface 200, a graphical indicator can signify that a meeting is effective if the meeting effectiveness score exceeds a particular target participation score. At the same time, the meeting effectiveness indicator in the user interface can indicate a medium level of effectiveness or low level of effectiveness when the meeting effectiveness score is at or below the target participation score.

Figure 4:
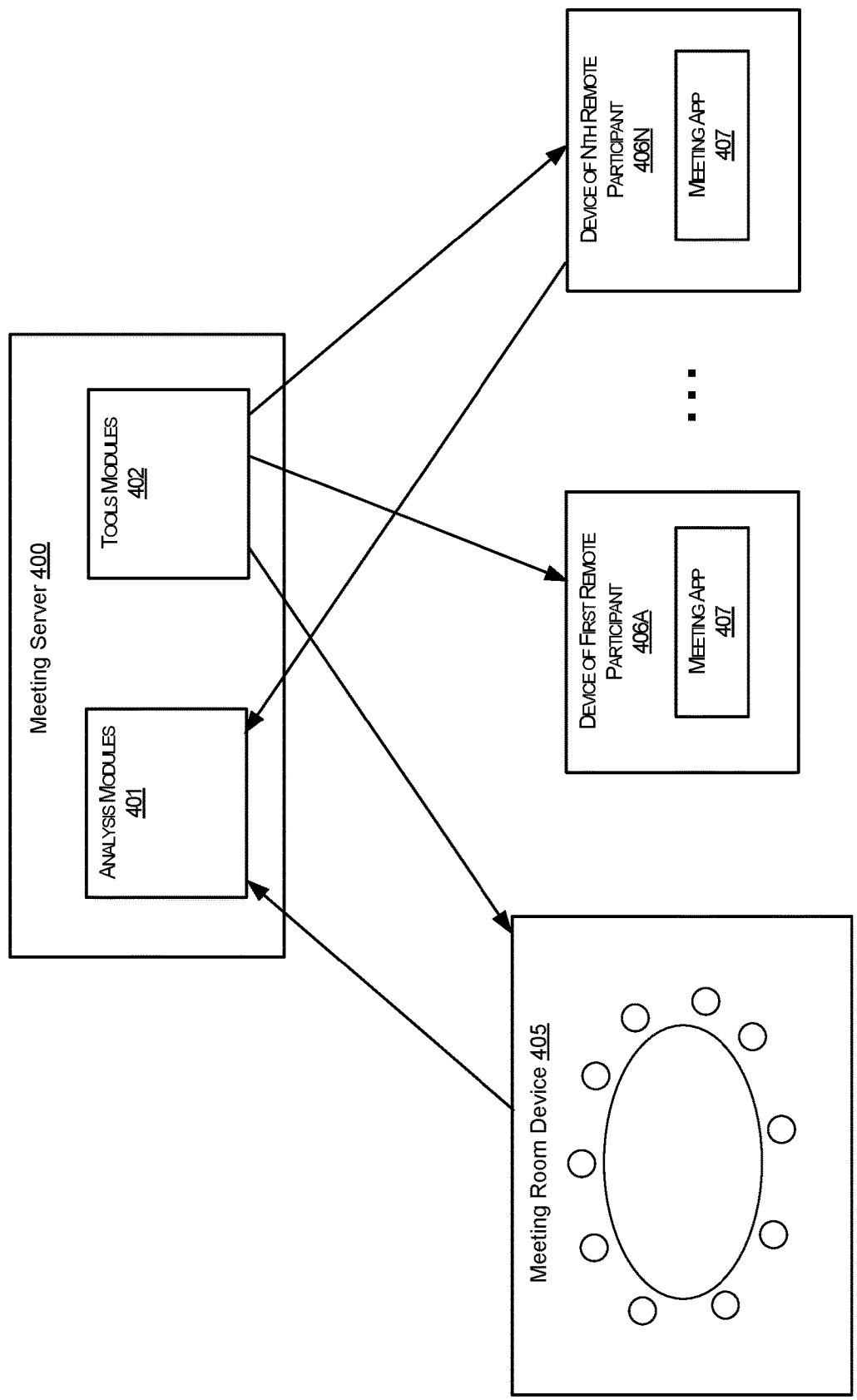
FIG. 4 is a block diagram illustrating aspects of the meeting server and remote devices.

With reference to FIG. 4, aspects of the system 100 are shown and described below. As shown, the system can include a meeting server 400. The meeting server 400 can also include one or more analysis modules 401 and one or more tools modules 402. This diagram also shows aspects of a hybrid system where multiple users are together in one location communicating through a meeting room device 405 and a number of individual users each using remote participant computers 406. The system can utilize any number of meeting room devices and any number of remote participant devices 406A-406N.

Figure 5:
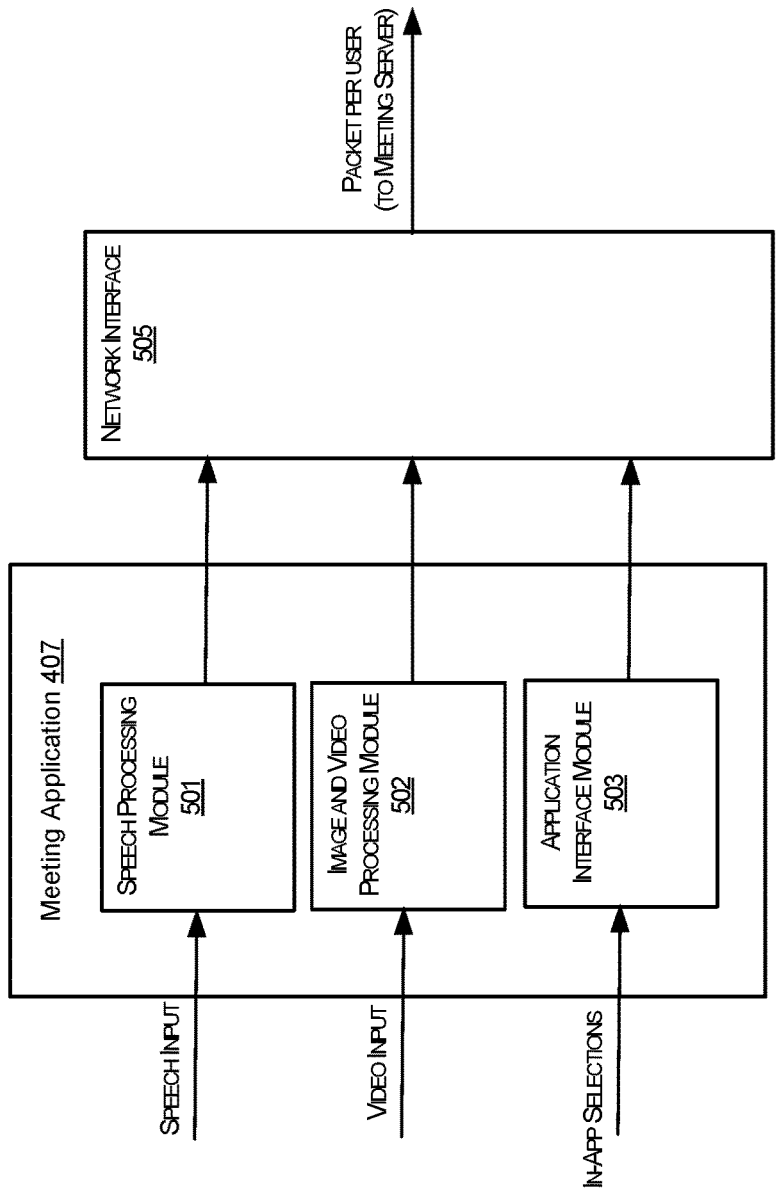
FIG. 5 is a block diagram illustrating aspects of a meeting application.

The remote participant computers 406 comprise a meeting application 407, such as Teams, Slack, Google Hangouts, etc. As shown in FIG. 5, the meeting applications 407 each contain modules that process user's speech and video input and record user selections in the meeting application. For example, Teams allows a user to select the "hand raise" icon to ask a question or to answer a question. This information can be packed in a per participant manner and sent over to a meeting server 400. When there are multiple participants in a location, e.g., a meeting room, the per participant speech can be obtained by applying speech processing techniques such as microphone array processing to direct the microphone to the speaker and speaker diarization to separate overlapping speech. Speaker diarization is a task to label audio or video recordings with classes that correspond to speaker identity, or in short, a task to identify who spoke when.

In this example, the meeting application 407 comprises a speech processing module 501, and image and video processing module 502, and an application interface model 503. The speech processing model 501 receives speech input where one or more processing techniques can be applied. For instance, the speech processing model 501 can utilize microphone array, noise echo cancellation, compression, and other techniques for processing speech input. The image and video processing module 502 can receive video input. The image and video processing model 502 can apply techniques such as image denoising, edge detection, compression, etc. These techniques can be utilized to filter and clean the input signals for providing contextual information to the server. The application can also receive user selections, such as a user selection of a menu item, a hand raise button, etc. These inputs can be combined and sent to the meeting server 400 via a network interface 505.

In one illustrative example, consider a scenario where there are a total of K client devices and N participants in a meeting. In this example, N participant related packets are sent to a meeting server. The server monitors the meeting dynamics, analyzes each participant's available information (e.g., speech, video, in app selections), and sends messages or control signals to each client device as shown in FIG. 6.

Figure 6:
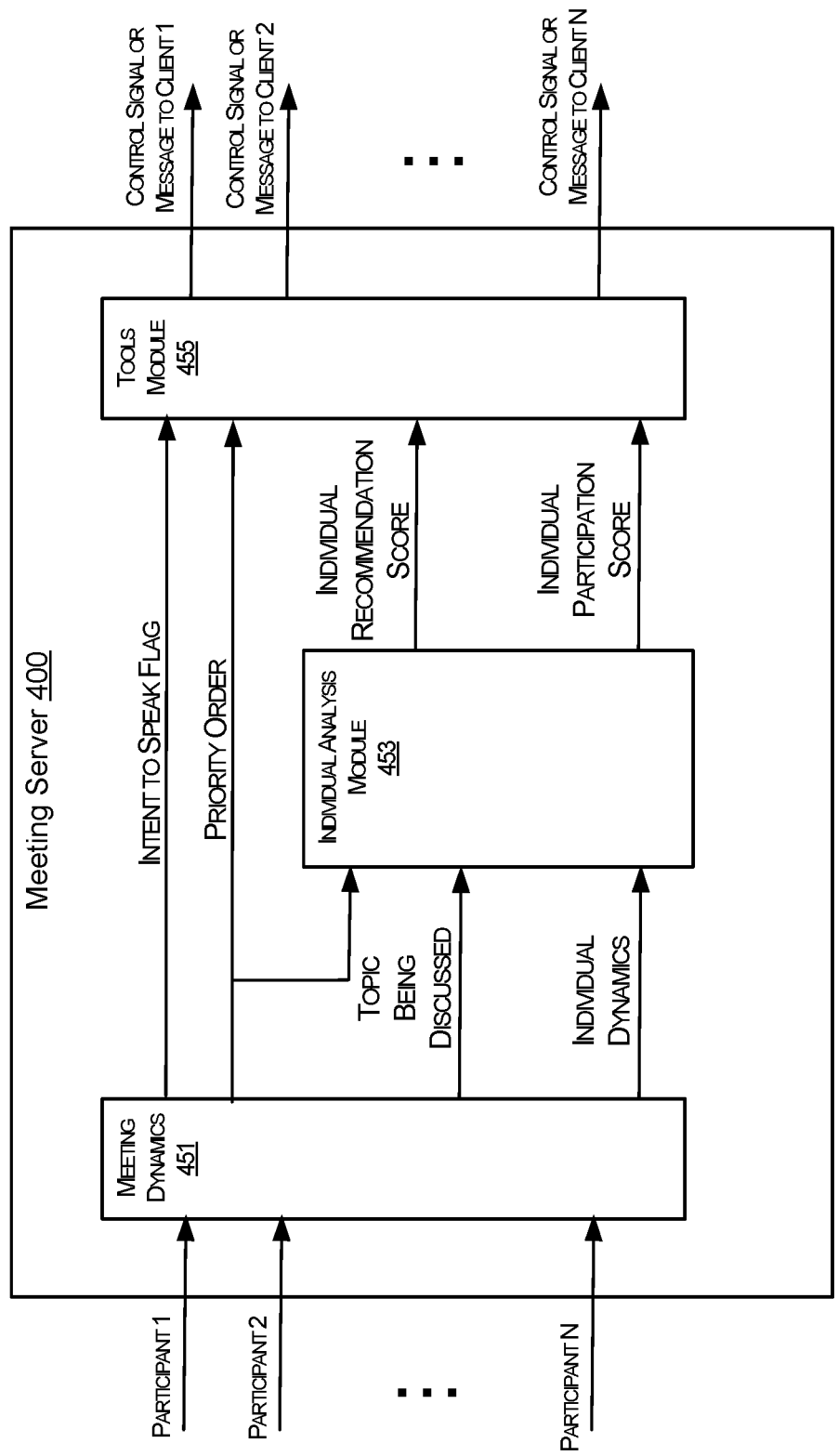
FIG. 6 is a block diagram showing components of a meeting server.

FIG. 6 shows aspects of the meeting server 400. The meeting server 400 includes a meeting dynamics module 451, an individual analysis module 453, and a tools module 455. The meeting dynamics module 451 tracks each individual's meeting behavior. For example, the meeting dynamics module 451 can track the number of attempts to speak, duration of participation or silence, and willingness to support the views of others and adopt other's constructive suggestions etc. The system can analyze transcripts made from an audio signal to determine a persons intent, e.g., if they are supportive of the views of other attendees or accepting of feedback of others. The system can also monitor higher level information such as the topics being discussed and the order of participant's intention to join a discussion.

Figure 7:
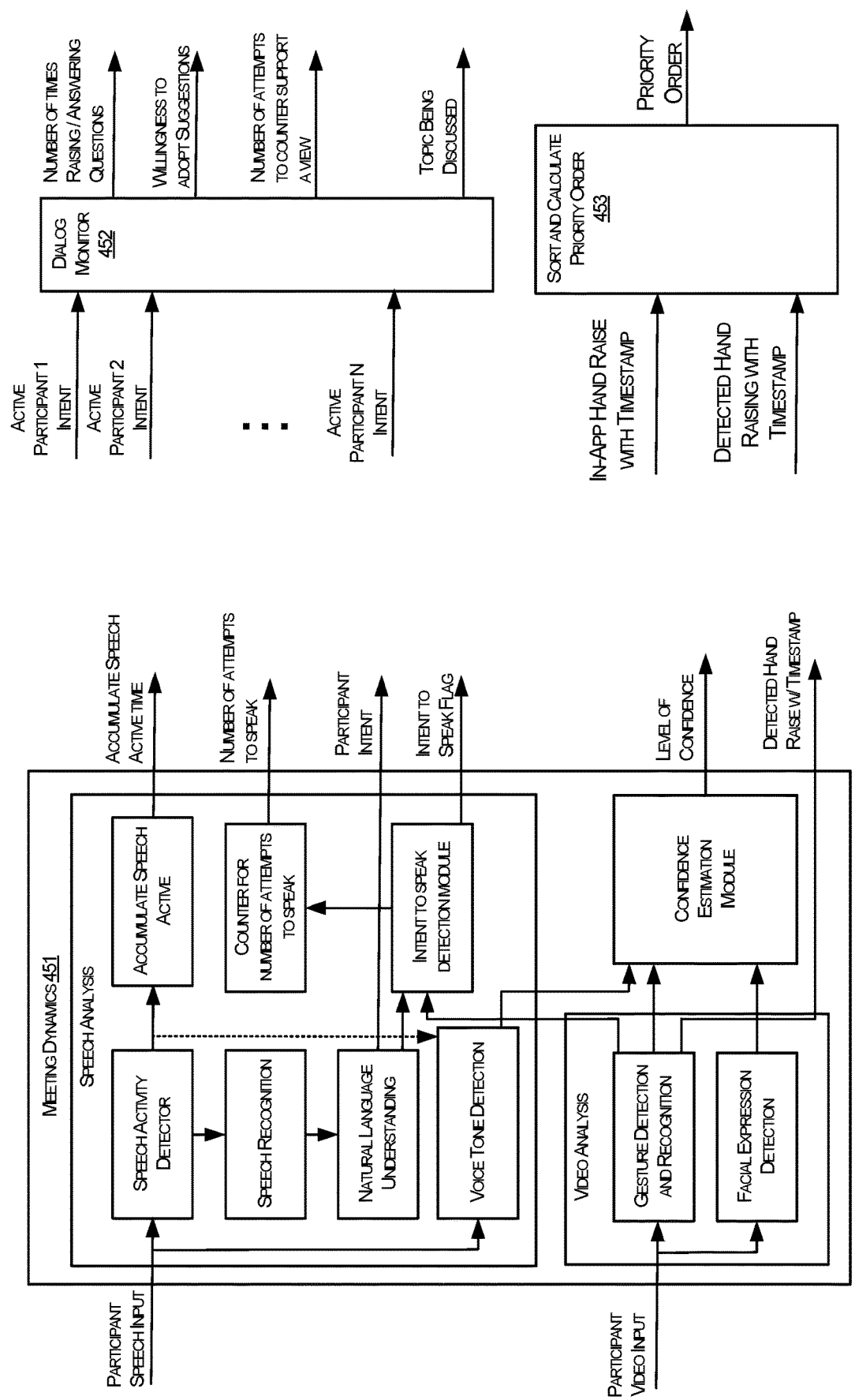
FIG. 7 is a block diagram illustrating aspects of a meeting dynamics module.

FIG. 7 shows a block diagram of various components of the meeting dynamics module 451. The techniques disclosed herein can utilize any suitable technologies for modules such as the speech activity detector, speech recognition, natural language understanding, voice tone detection, gesture detection and recognition, facial expression detection etc. The intend to speak detection module takes language cue, gesture cue and facial expression cue to determine if a participant is intending to speak or not. These cues can be generated by using generic speech, gesture, and facial expression recognition methods. Or they can be personalized by studying each participant's history data about way of speaking, gestures or facial expressions demonstrated when intend to speak and then update the personalized model for improved performance. There are many studies in these techniques that are readily usable. Similarly, a level of confidence can be determined by examining the voice tone and related gestures and facial expressions when a participant is speaking. The dialog monitor 452 tracks the dialog flow of all the participants to figure out topics being discussed, number of times a participant raising or answering questions, willingness to adopt suggestions, and number of attempts to counter support a view.

The "sort and calculate priority order" module 453 is designed to receive in-application (in-app) inputs which are recorded with a timestamp. Other gestures can be received with a timestamp, including but not limited to hand gestures or facial gestures that are captured using a video camera. The sort and calculate priority order module 453 can also generate a priority order based on these inputs. In some configurations, users having an input with a first timestamp are given a priority order that is higher than a user having an input with a second timestamp, wherein the second timestamp is later than the first timestamp. The input to this submodule includes user in-app hand raising icon selection time or the time that a participant was recognized in the video stream that he or she raised a physical hand. The time is used to determine a priority order for every participant who raised their hand as:

$$PO_i = \begin{cases} 1 - \dfrac{\text{order}_i}{\text{sum of order}}, & \text{if the partipant raised his or her hand} \\ 0, & \text{if the partipant didn't raise his or her hand} \end{cases}$$

Where, $\text{order}_i$ is the order of participant i in raising his/her hand to speak. For example, if there is total of 5 participants raising hands and participant i is the $3^{rd}$ one in order. Then $$PO_i = 1 - \dfrac{3}{1+2+3+4+5} = 0.8.$$

This can guarantee that $PO_i$ is a value between [0, 1] and all the $PO_i$ add up to 1.

Topics being discussed output of the dialog monitor submodule can be get from the meeting agenda or from understanding all the current participants speech signals using speech recognition, natural language understanding, and conversational AI techniques to determine a topic.

Figure 8:
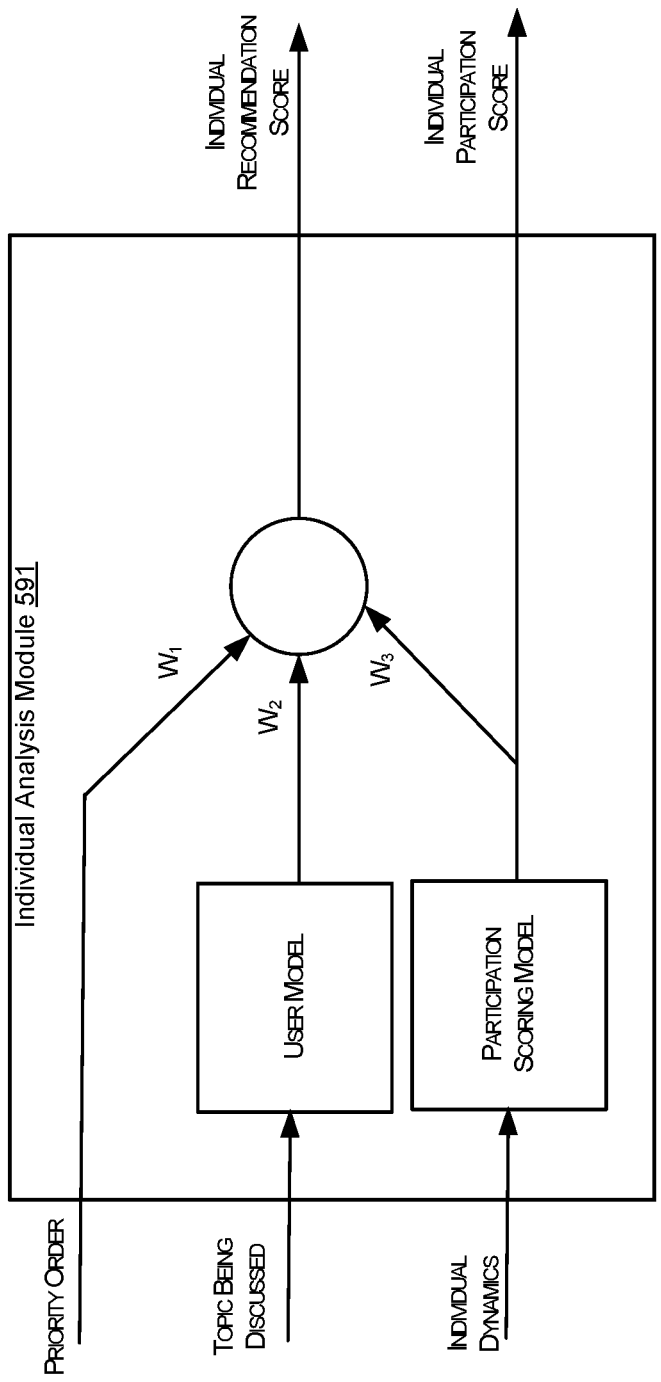
FIG. 8 is a block diagram illustrating aspects of an individual analysis module.

Turning now to FIG. 8, aspects of an individual analysis mode 591 are shown and described below. In some configurations, the individual analysis module 519 is configured to determine if the participant is a good candidate for a discussion topic and to track the meeting participation status of each participant. A number of inputs can be received at this module including the priority order, one or more topics that can be determined from a transcript or audio data, and data defining individual dynamics.

The output of the meeting dynamics module is passed to the individual analysis module for generating an individual participation score or an individual recommendation score or both. Both these scores can have value from 0 to 1. The higher the participation score means the more active the participant is. The higher the recommendation score means the participant appears earlier in the recommend list to the person who asked a question. FIG. 8 shows the higher level diagram of the individual analysis module 591.

The "individual dynamics" input of the individual analysis module includes Number of attempts to speak, Duration of participation, Level of confidence, Number of times raising/answering questions, Willingness to adopt suggestions, and Number of attempts to counter support a view output from the meeting dynamics module shown in FIG. 6. In some configurations, level of confidence can be determined by an evaluation of audio data and or video data. As described herein, the confidence level can be increased when a user has a predetermined posture, e.g., has a more upright position, the confidence level can be decreased when the user has a another determine posture, e.g., a less upright position. Voice inflection patterns can also indicate a level of confidence, including sentences that have a reduced volume over time, which may indicate a low confidence level; or sentences that have it increased volume over time, which may indicate a high confidence level.

Figure 9:
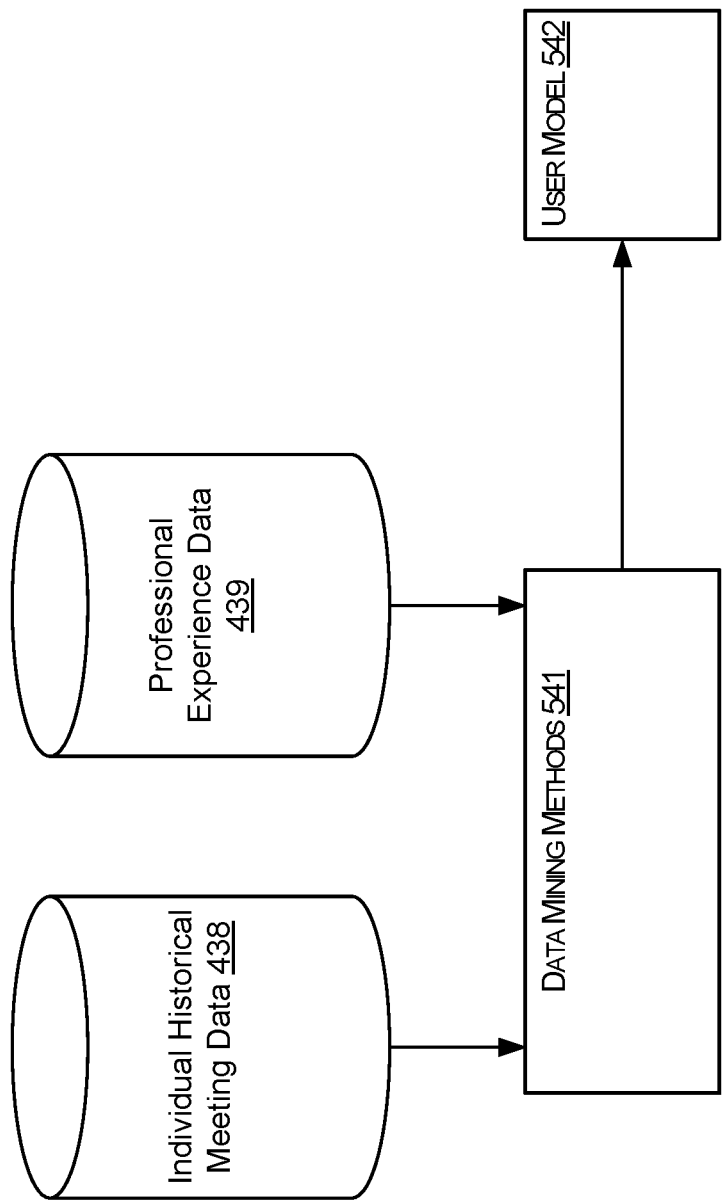
FIG. 9 is a block diagram illustrating different types of data that can be used for mining methods.

The topic information is passed to a personalized user model to find a topic familiarity score. Data mining algorithms such as K-means clustering algorithm can be used to classify user's background data such as data from past meetings or user's professional experience data, e.g., LinkedIn Profile, into reaction or knowledge to particular kinds of topics, e.g., business development or engineering design, as outlined in FIG. 9. The topics can be further divided into subcategories such as in engineering design, subcategories can be audio processing chain architecture design, audio processing algorithm design etc. Reaction can be classified as how many times the individual actively participated in the topic discussion in the past. Knowledge can be represented in years of experience in the topic. This data can be stored in individual historical meeting data 438 or professional experience data 439, which can be processed in one or more data mining methods 541. These are compiled into a user model 542, which is also referred to herein as a profile.

When an input topic is received by the system, the algorithm searches the user model for a match, if no match was found, a familiarity score of 0 is returned. If a match was found, then depending on the reaction and knowledge, a familiarity score is assigned. One example implementation can be if more than 10 years of experience or actively participated in the related topic discussion in the past more than 50 times, a familiarity score of 1 is assigned, Then the familiarity score can be generated using a linear function such as, but not limited to:

$$FamScore_i = 0.5 * \dfrac{NumYearExperience_i}{10} + 0.5 * \dfrac{NumActiveDiscussion_i}{50}$$

Figure 10:
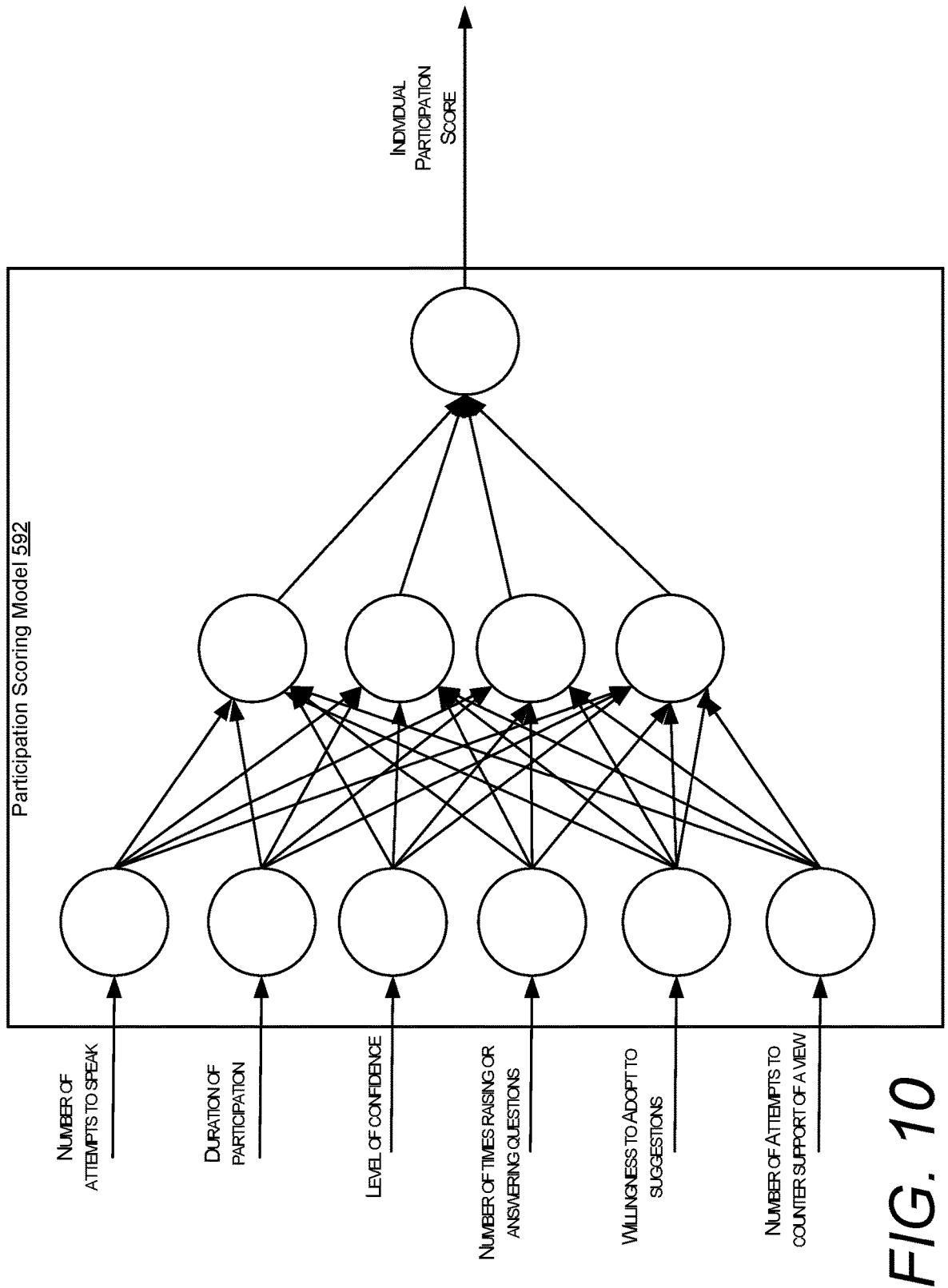
FIG. 10 is a diagram of a participation scoring model.

For the participation scoring model, the system 100 can use multiple factors: Number of attempts to speak, Duration of participation, Level of confidence, Number of times raising/answering questions, Willingness to adopt suggestions, and Number of attempts to counter support a view and determine a score using a multilayer neural network as shown in FIG. 10. FIG. 10 shows a Participation Scoring Model 592.

Meeting records are utilized and based on the factors listed above, a participation score is manually evaluated for each meeting participants to prepare training data for the neural network. Once the neural network is trained, it can be used to evaluate individual participation score. The individual participation score (ParScore) is also a value between [0, 1] with 1 represent highly the participant is highly active.

The priority order, topic familiarity score, and the participation score are then combined to generate an individual recommendation score. One example implementation can be $$RecScore_i = w_1 PO_i + w_2 FamScore_i + w_3(1 - ParScore_i)$$

where $w_1$, $w_2$, $w_3$ can be percentage of contribution of each factor to the overall recommendation score. A typical choice could be 0.5, 0.3, 0.2, for example.

Returning to FIG. 6, additional aspects of the tools module and the dynamic meetings module are shown and described. The tools module uses the information provided by the meeting dynamics module and the individual analysis module to track the effectiveness of a meeting, provide meeting status update, and system recommendations to a meeting moderator in assisting meeting moderation.

The effectiveness of a meeting is tracked using meeting effectiveness score, which is based on the meeting type, the team participation statistics (mean and variance), and the agenda completion progress. The purpose is to use the meeting effectiveness score to guide the meeting moderation activities. The meeting type can be determined based on the meeting title and its related agenda items. For example, the system can classify meetings as (1) Information sharing meetings—Company/Group wide meetings, (2) Knowledge improvement meetings—Trainings, (3) Status checking meetings—Project status meetings, some actions/decisions could be made, and (4) Strategic decision making meetings, i.e., decision making.

Team participant score can be calculated as the mean of individual participation score $$TeamParScore = \frac{\sum_{i=1}^{N} ParScore_i}{N}$$

Since individual participation score has value in [0, 1]. TeamParScore also has value in [0, 1]. For each meeting type, the system can pre-define an expected team participant score as shown in the following Table 1:

TABLE 1

Desired Team Participant Score versus Meeting Type

| Meeting Dynamics Matrix | | Desired Team's Participation Score | | | | |
| --- | --- | --- | --- | --- | --- | --- |
| | | QUITE | LOW | MEDIUM | HIGHLY | SUPER HIGH |
| Meeting Type | SHARE INFORMATION | ✓0 | ✓0 | −1 | −2 | −3 |
| | TRAINING | −1 | ✓0 | ✓0 | −1 | −2 |
| | STATUS TRACKING & PLANNING | −2 | −1 | ✓0 | ✓0 | −1 |
| | STRATEGIC DECISION | −3 | −2 | −1 | ✓0 | ✓0 |

Quite Low means TeamParScore≤0.2; Low means 0.2<TeamParScore≤0.4; Medium means 0.4<TeamParScore≤0.6; High means 0.6<TeamParScore≤0.8; and Super High means 0.8<TeamParScore≤1. The team participation contribution (TPC) to the meeting effectiveness score using a number of methods. In one illustrative example, a method can include operations for initializing a team participation contribution to a predetermined value, e.g., 5. Operations can also include a calculation of a team participation score as described herein. The operations can also cause a system to check the team participation score with the predefined boundary determine one out of the predetermined number of categories, e.g., the five categories, use the outline of Table 1 to determine a value. Operations disclosed herein can also cause a system to add number received from the table to the TPC. In this case penalties can be introduced to the TPC.

In the example shown in Table 1, the participation score can be reduced if a particular input is received that's not consistent with the meeting type. For instance, in a scenario where meeting is supposed to be about sharing information, e.g., a score is not reduced, e.g., a zero value is determined from the table, when users are generally quiet participation is low. This is because this type of meeting is intended for one person to provide information to others and when others are speaking and interrupting the presenter, the goal of that type of meeting is no longer met. Thus, when team participation is at a medium level, a team participation score can be reduced. As shown, as the team participation increases, e.g., people are talking over the presenter, the penalty can increase. In this example, the penalty can increase to a value of negative three.

Beside team participation score, we also look at the team participation variance. A meeting with equal opportunity to every participant is encouraged. A lower variance means the individual participation scores are more closely centered around the team participation score (mean) and each participant gets a chance to express his/her opinion. This means a meeting with lower participation variance is more effective. Participation variance can be calculated as TeamParVariance=$\sum_{i=1}^{N}(ParScore_i - TeamParScore)^2$. In the extreme case of only one person talks, the TeamParVariance will be close to one. In the extreme case of everyone has the same individual participation score, the TeamParVariance will be zero. So TeamParVariance has value between [0, 1). The dynamics matrix for this factor is show in Table 2:

TABLE 2

| Dynamics Matrix | | Desired Team Participation Variance | | | | |
| --- | --- | --- | --- | --- | --- | --- |
| | | Quite Low | Low | Medium | High | Super High |
| Meeting Type | Share information | −3 | −2 | −1 | ✓0 | ✓0 |
| | Training | −2 | −1 | ✓0 | ✓0 | −1 |
| | Status checking and planning | −1 | ✓0 | ✓0 | −1 | −2 |
| | Strategic decision | ✓0 | ✓0 | −1 | −2 | −3 |

Quite Low means TeamParVariance≤0.2; Low means 0.2<TeamParVariance≤0.4; Medium means 0.4<TeamPar- Variance≤0.6; High means 0.6<TeamParVarian≤0.8; and Super High means 0.8<TeamParVariance<1. Participation variance contribution (PVC) to the meeting effectiveness score can be calculated using a number of different method.

In one illustrative example, a system can involve operations for initializing participation variance contribution (PVC) to predetermined number. In this example, the predetermined number can be five. Using the techniques disclosure in the system can calculate the team participation variance. Next, the system can check the team participation variance with the predetermined boundary to determine one out of the predetermined categories, e.g., 5, and use TABLE 2 determine an output value. The output value time from 12 can then be applied to the PVC.

The percentage of agenda items completed is the third factor affecting the meeting effectiveness score. The percentage of agenda items completed can be simply calculated as $$\frac{\text{Number of discussed agenda items}}{\text{total number of agenda items}} * 100\%.$$

The number of discussed agenda items can be counted by correlating the "topic being discussed" output of the dialog monitor module in FIG. 4. The agenda completion contribution (ACC) to the meeting effectiveness score is calculated as:

$$ACC = \begin{cases} 5, & \text{Percentage} = 100\% \\ 4, & 80\% \leq \text{Percentage} < 100\% \\ 3, & 60\% \leq \text{Percentage} < 80\% \\ 2, & 40\% \leq \text{Percentage} < 60\% \\ 1, & 20\% \leq \text{Percentage} < 40\% \\ 0, & 0 \leq \text{Percentage} < 20\% \end{cases}$$

The meeting effectiveness score is a weighted sum of the three factors:

MeetingEffScore=$w_1$*TPC+$w_2$*PVC+$w_3$*ACC

Where, $w_1+w_2+w_3=1$ are the weights for each factor. MeetingEffScore is rated from 0 to 5 with 5 being the most effective.

With all the information provided by the meeting dynamics module, the individual analysis model, and the tracked online meeting effectiveness score, the tools module uses the logic shown in FIG. 10 to assist moderating a topic discussion in progress. The tools module maintains two threads with one constantly checking on intend-to-speak in-room and remote participants and another constantly monitoring meeting effectiveness score. When there is a change in intend-to-speak participants or when meeting effectiveness score is below a threshold level, an interrupt is triggered to check the logic in FIG. 11 to update the ordered list of system recommended speakers.

Figure 12:
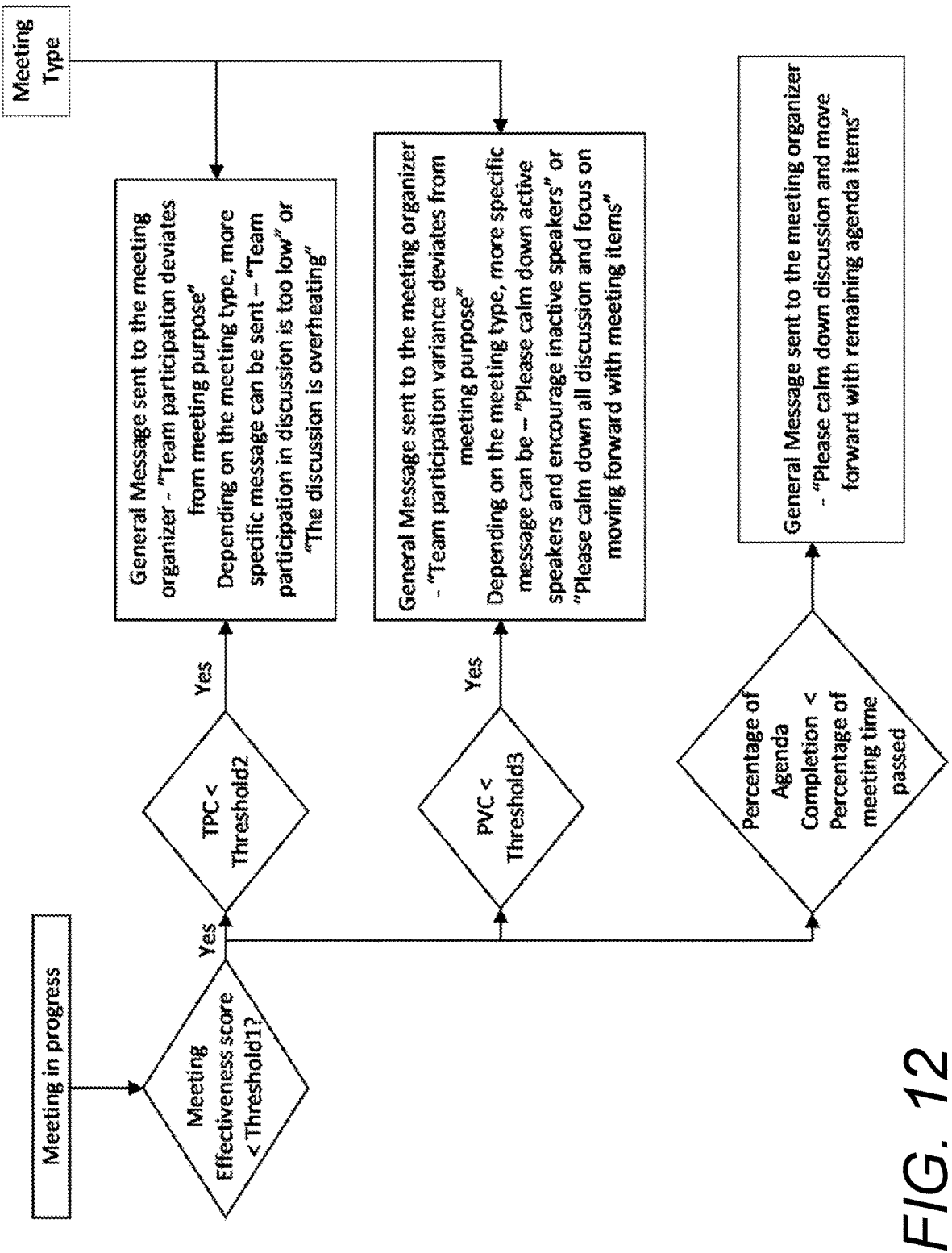
FIG. 12 is a flow diagram showing aspects of a routine for receiving data indicating a meeting type and other activity data for generating a output message.

The tools module also sends messages to the meeting moderator when the meeting deviates from its purpose. The messages are to remind the meeting moderator to actively moderate the meeting to improve the effectiveness of the meeting. An example logic is shown in FIG. 12. The messages and the values determined from this process can be utilized to generate the moderator user interface 200 as shown in FIG. 2A.

The Meeting Effectiveness can be a dynamic progressing bar with length corresponding to the meeting effectiveness score value. Color changes among red, yellow, and green, with red representing a score below 2, yellow representing a score between 2 and 4, and green representing a score greater than 4. Also shown in FIG. 2A, the length of the recommendation element 211 can be determined by the recommendation score. A higher score for recommending a change can cause a bar to be longer or increased in size and a lower score can cause the bar to be shorter or decreased in size.

Aspects of the time ordered wait-to-speak Queue 210 shown in FIG. 2A are now described in more detail. A Queue for meeting moderator to call out names based on the speakers' intention to speak in a time order (priority order). The speaker icon is also labeled with system recommendation info. The arrows on the right-hand side illustrate the system recommendation for the next three speakers in line. A down arrow (which can be red) means system recommends lowering the priority. A horizontal arrow (which can be blue or yellow) means system recommends keeping the priority. A up arrow (which can be green) means system recommends increasing the priority. The right-hand side acronyms represent the speaker's characteristics from system analysis. For example, FS (frequent speaker), SME (subject matter expert), SA (silent attendee) etc.

The top recommendation 203D can include the top system recommended speaker. It can be one of the three candidates in the time ordered queue, or a candidate who raised his/her hand later than the first three candidates, or someone who didn't raise his/her hand. The top recommendation speaker is chosen from the waiting queue with the highest recommendation score. The icon for the top recommendation can also be labeled in a similar fashion explained before. With a up arrow from bottom to top of the icon to illustrate recommendation strength is the highest.

The specific system message can remind the meeting moderator how to improve the meeting efficiency. The system can generate these messages from a predetermined list of messages or messages can be generated based on the any of the determine values, including recommendation scores that are below or above a threshold. For instance, if a variance indicates that activity is inconsistent with a meeting type, e.g., a negative three value shown in TABLE 1, the system may generate a message to indicate that moderator should calm the meeting down to the next speaker.

Figure 11:
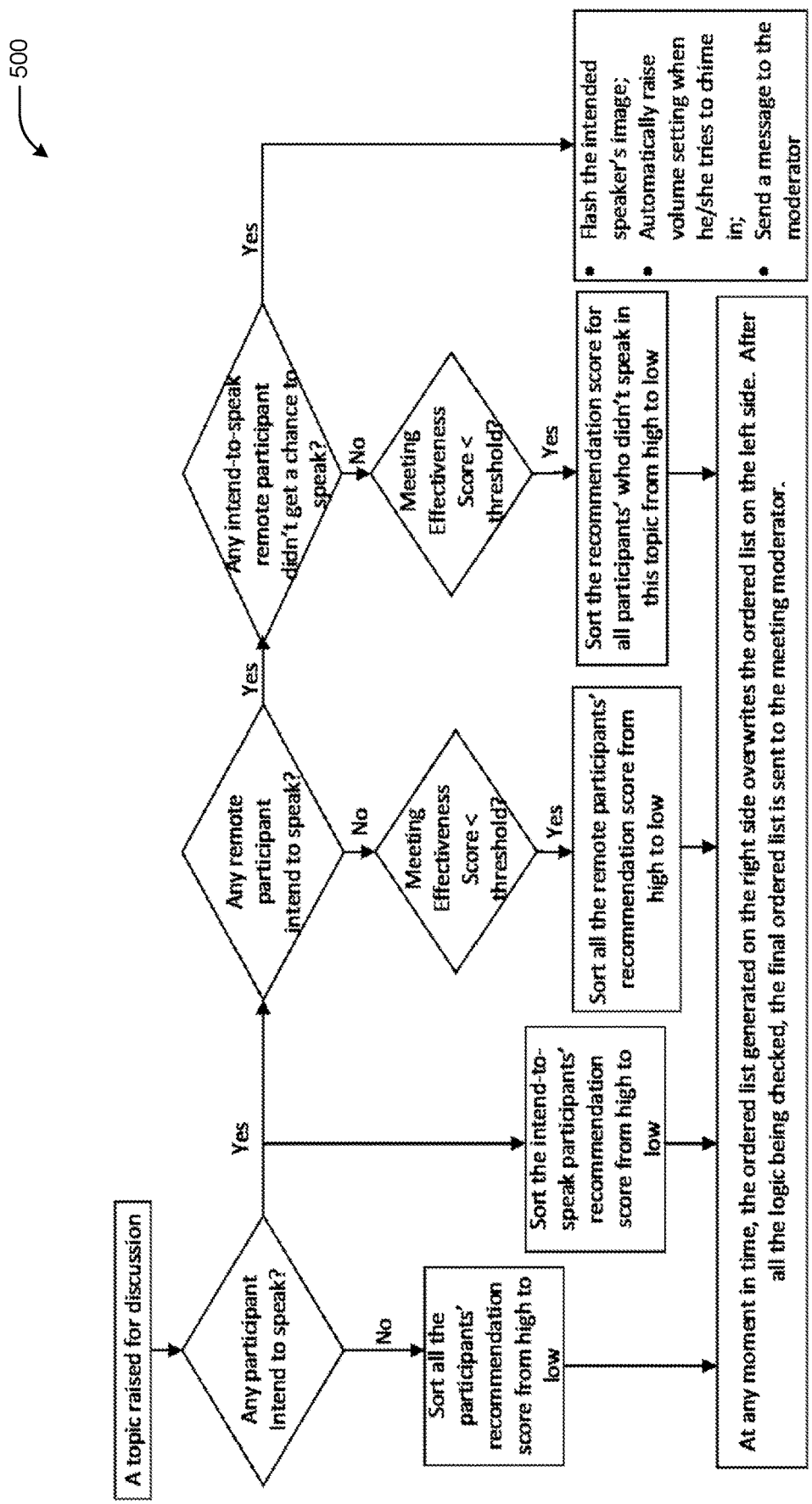
FIG. 11 is a flow diagram showing aspects of a routine for receiving topics and controlling an ordered list.

FIG. 11 and FIG. 12 are diagrams illustrating aspects of a routine 500 for the techniques disclosed herein. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIGS. 11 and 12, and the other FIGURES can be implemented in association with the example presentation user interfaces UI described above. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 500 includes an operation for receiving data indicating a topic being raised in the discussion. This input can be from an analysis of transcripts or an analysis of audio data or content sharing within the meeting. The system can then determine if a participant intended to speak. This can be done by a number of gestures, e.g., hand raises or attempts to speak detected by audio detection for movement detection. If an input is received indicating an intent to speak, the system can determine if any remote participant intended to speak. If remote attendee intended to speak, the system determines if that person did actually speak. This can be done by one or more voice recognition or gesture recognition. If the system determines that the remote participant did speak, the system provides a notification such as an image.

If input data indicates that a participant did not have intention to speak, the system sorts the participants in a predetermined manner. If a remote participant does not intend to speak, the system can utilize the meeting effectiveness score, and if the meeting effectiveness score meets one or more conditions relative to a threshold, the system can sort the remote participants according to the score. If a remote participant had intentions to speak but did not get a chance to speak, the system can utilize the meeting effectiveness score relative to a threshold and sort recommendations according to the score. FIG. 12 illustrates aspects of a meeting in progress. If a meeting effectiveness score is less than the threshold the TPC, PVC and a percentage of agenda completion can be utilized to determine messages being sent to various users. The system can also utilize meeting type to determine the contents and timing of messages.

Figure 13:
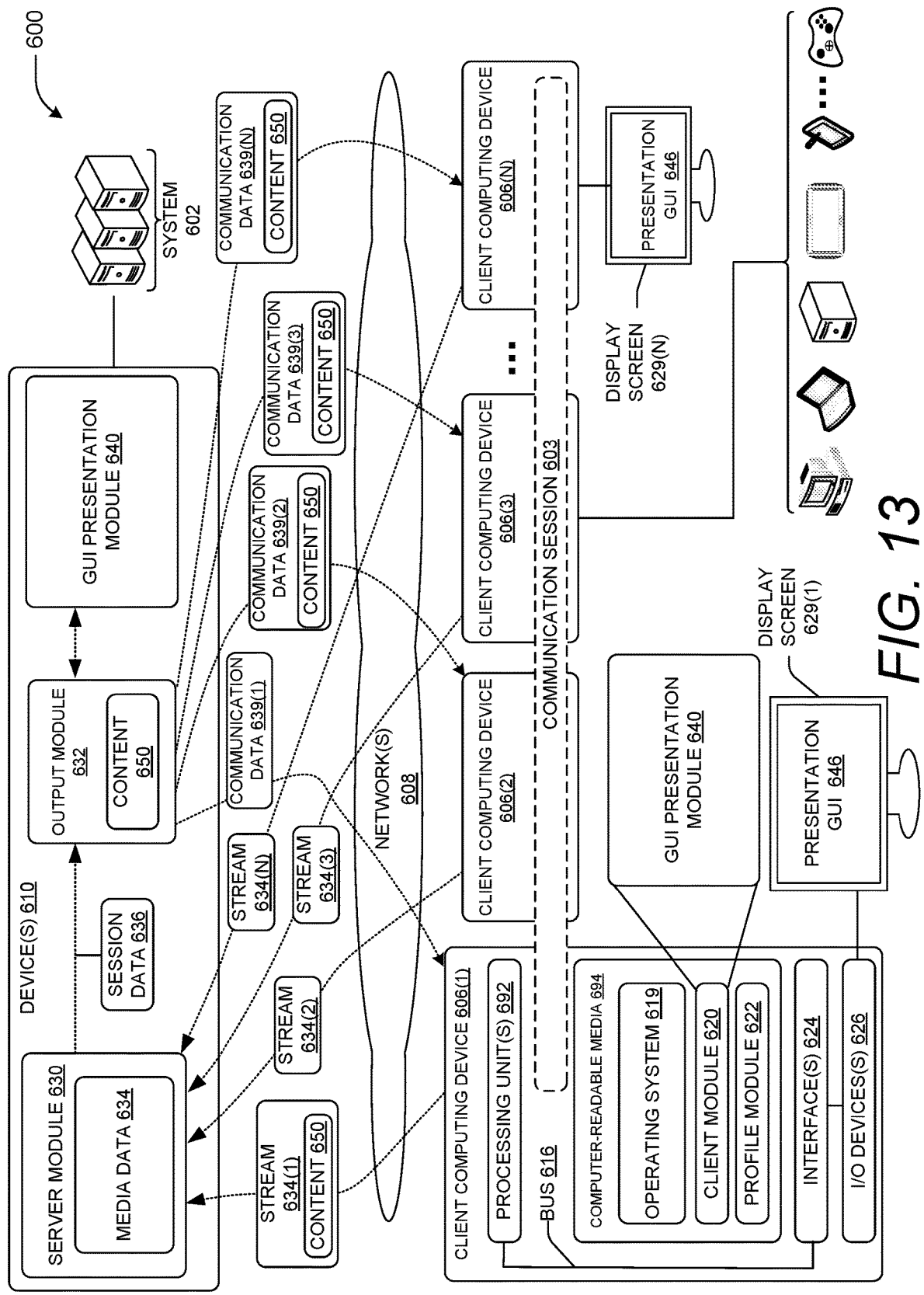
FIG. 13 is a computer architecture diagram illustrating an illustrative computer hardware and software architecture for a computing system capable of implementing aspects of the techniques and technologies presented herein.

FIG. 13 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 604 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 604.

In this example, the communication session 604 is hosted, over one or more network(s) 608, by the system 602. That is, the system 602 can provide a service that enables users of the client computing devices 606(1) through 606(N) to participate in the communication session 604 (e.g., via a live viewing and/or a recorded viewing). Consequently, a "participant" to the communication session 604 can comprise a user and/or a client computing device (e.g., multiple users may be in a room participating in a communication session via the use of a single client computing device), each of which can communicate with other participants. As an alternative, the communication session 604 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 604. A computing system 602 that collects participant data in the communication session 604 may be able to link to such external communication sessions. Therefore, the system may receive information, such as date, time, session particulars, and the like, that enables connectivity to such external communication sessions. In one example, a chat conversation can be conducted in accordance with the communication session 604. Additionally, the system 602 may host the communication session 604, which includes at least a plurality of participants co-located at a meeting location, such as a meeting room or auditorium, or located in disparate locations. A communication session 604 can include a start time and an end time, which can determine when video streams and live audio can be shared. Text and content can be shared outside of the start time and end time.

In examples described herein, client computing devices 606(1) through 606(N) participating in the communication session 604 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 604 live as activity occurs, or alternatively, via a recording at a later time after the activity occurs. In the examples described herein, client computing devices 606(1) through 606(N) participating in the communication session 604 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 13 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 604. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 13 illustrates that client computing device 606(1) is in some way connected to a display device (e.g., a display screen 629(N)), which can display a UI according to the techniques described herein.

In the example environment 600 of FIG. 13, client computing devices 606(1) through 606(N) may use their respective client modules 620 to connect with one another and/or other external device(s) in order to participate in the communication session 604, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 13) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 13, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 604 (the collection being referred to herein as "media data 634"). In some scenarios, not all of the client computing devices that participate in the communication session 604 provide a media stream. For example, a client computing device may only be a consuming, or a "listening", device such that it only receives content associated with the communication session 604 but does not provide any content to the communication session 604.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 14:
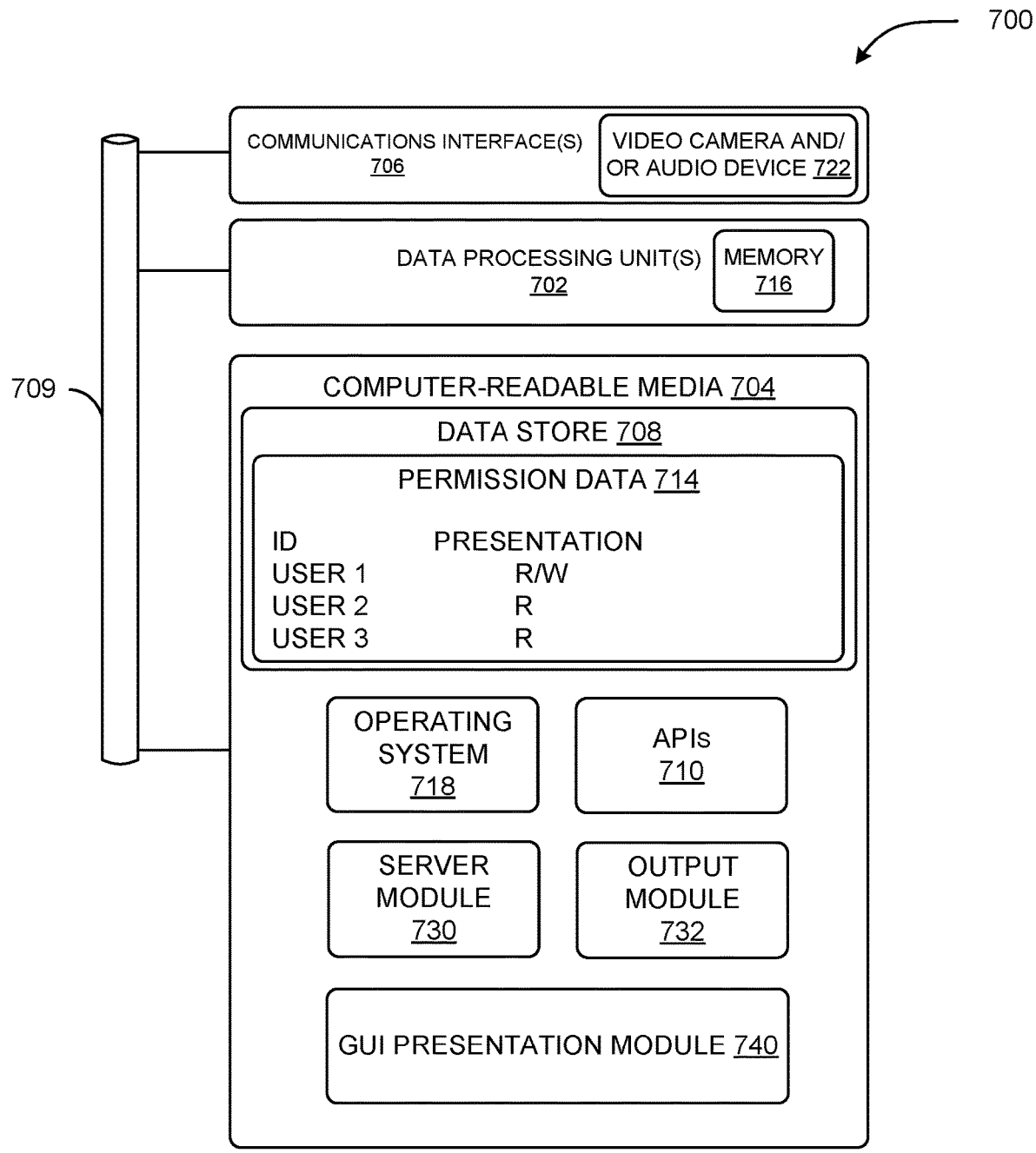
FIG. 14 is a diagram illustrating aspects of a device controlling communication sessions.

FIG. 14 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data (e.g., session data 636 as shown in FIG. 13), profile data (e.g., associated with a participant profile), and/or other data. The session data can include a total number of participants (e.g., users and/or client computing devices) in a communication session, activity that occurs in the communication session, a list of invitees to the communication session, and/or other data related to when and how the communication session is conducted or hosted.

The data store 708 may also include permission data 714, to indicate the access rights of each user. The access rights can be on a per user and per user interface region basis. Thus, at this granular level, the first user can have rights to see the content shared on the primary presenter region and also share content on the primary presenter region, which are respectively read and write permissions. At the same time, the first user can only have rights to see the contents of the second region (e.g., the Together Mode region) but not contribute to the presentation region, e.g., the user cannot be displayed on the presentation region unless that user has write permissions as a presenter.

The permission data 714 can define any type of activity or status related to the individual users 10A-10F each associated with individual video streams of a plurality of video streams 634. For instance, the contextual data can define a person's role, such as a moderator role. In this case, the moderator can control the permissions of other users including someone's ability to share information within the presentation region or be shown in the presentation region. The moderator can also control audio for each individual and audience members can be muted or allowed to speak to the indication session.

Some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A computer-implemented method for controlling a flow of presenters of a communication session, the computer-implemented method configured for execution on a computing system comprising:

determining an individual participation score for each of individual participants of a plurality of participants of the communication session, the individual participation score calculated is based on activity factors associated with each of the individual participants during the communication session including a number of attempts a participant of the plurality of participants has made to speak, a duration the participant has spoken in the communication session, and a detected confidence level that is based on a detection of a predetermined gesture of the participant;

determining an individual recommendation score for each of the individual participants of the communication session, the individual recommendation score for the participant is based on a combination of an individual participation score for the participant, a topic familiarity score for the participant, and a timing score for the participant, wherein the timing score is based on a time of an input indicating an intent to speak, wherein the topic familiarity score is based on a level of historical activity related to a topic;

causing a display of a moderator user interface comprising an ordered list of participants of the communication session, wherein the participants are ordered in accordance with individual recommendation scores for each individual in the ordered list; and receiving an input from a moderator having permissions for causing a computing device associated with the participant to receive presentation permissions, the presentation permissions permitting the participant in the ordered list to share content with the computing devices of other participants of the communication session.

2. The computer-implemented method of claim 1, wherein individual representations of each participant in the ordered list further comprises a recommendation element for providing notice of a recommendation to change the order of the participant in the ordered list, the recommendation to change the order of the participant being based on behavioral characteristics of the participant, the behavioral characteristics including a time in which the participant has spoken in the meeting, wherein the recommendation for the participant is to lower the priority of the participant if the participant has spoken for more than a threshold amount of time.

3. The computer-implemented method of claim 1, wherein individual representations of each participant in the ordered list further comprises a recommendation element for providing notice of a recommendation to change the order of the participant in the ordered list, the recommendation to change the order of the participant being based on characteristics of the participant, the characteristics including a threshold match of a level of knowledge of the participant for a topic and a topic associated with the communication session.

4. The computer-implemented method of claim 1, further comprising:
determining and effectiveness score based on at least one of a completeness score for an agenda or a team participation score; and
generating a graphical element conveying a value of the effectiveness score.

5. The computer-implemented method of claim 4, wherein the team participation score is based on a variance, wherein the variance decreases the team participation score if collective activity of a number of participants does not meet one or more criteria with respect to a meeting type, wherein a reduction of the team participation score reduces the effectiveness score.

6. The computer-implemented method of claim 4, wherein the team participation score is based on a variance, wherein the variance maintains the team participation score if collective activity of a number of participants meets one or more criteria with respect to a meeting type, wherein maintaining the team participation score maintains the effectiveness score.

7. The computer-implemented method of claim 1, further comprising:
generating a message for influencing the flow of a meeting based on a team participation score; and
causing a display of the message within the moderator user interface.

8. A computing device for controlling a flow of presenters of a communication session, comprising:
one or more processing units; and
a computer-readable storage medium having encoded thereon computer-executable instructions to cause the one or more processing units to perform a method comprising:
determining an individual participation score for each of individual participants of a plurality of participants of the communication session, the individual participation score is calculated based on activity factors associated with each of the individual participants during the communication session including a number of attempts a participant of the plurality of participants has made to speak, a duration the participant has spoken, and a detected confidence level that is based on a detection of a predetermined gesture of the participant;
determining an individual recommendation score for each of the individual participants of the communication session, the individual recommendation score for the participant is based on a combination of an individual participation score for the participant, a topic familiarity score for the participant, and a timing score for the participant, wherein the timing score is based on a time of an input indicating an intent to speak, wherein the topic familiarity score is based on a level of historical activity related to a topic;
causing a display of a moderator participant interface comprising an ordered list of participants of the communication session, wherein the participants are ordered in accordance with individual recommendation scores for each individual in the ordered list; and
receiving an input from a moderator having permissions for causing a computing device associated with the participant to receive presentation permissions, the presentation permissions permitting the participant in the ordered list to share content with computing devices of other participants of the communication session.

9. The computing device of claim 8, wherein individual representations of each participant in the ordered list further comprises a recommendation element for providing notice of a recommendation to change the order of the participant in the ordered list, the recommendation to change the order of the participant being based on behavioral characteristics of the participant, the behavioral characteristics including a time in which the participant has spoken in the meeting, wherein the recommendation for the participant is to lower the priority of the participant if the participant has spoken for more than a threshold amount of time.

10. The computing device of claim 8, wherein individual representations of each participant in the ordered list further comprises a recommendation element for providing notice of a recommendation to change the order of the participant in the ordered list, the recommendation to change the order of the participant being based on characteristics of the participant, the characteristics including a threshold match of a level of knowledge of the participant for a topic and a topic associated with the communication session.

11. The computing device of claim 8, wherein the method further comprises:
determining and effectiveness score based on at least one of a completeness score for an agenda or a team participation score; and
generating a graphical element conveying a value of the effectiveness score.

12. The computing device of claim 11, wherein the team participation score is based on a variance, wherein the variance decreases the team participation score if collective activity of a number of participants does not meet one or more criteria with respect to a meeting type, wherein a reduction of the team participation score reduces the effectiveness score.

13. The computing device of claim 11, wherein the team participation score is based on a variance, wherein the variance maintains the team participation score if collective activity of a number of participants meets one or more criteria with respect to a meeting type, wherein maintaining the team participation score maintains the effectiveness score.

14. The computing device of claim 8, further comprising:
generating a message for influencing the flow of a meeting based on a team participation score; and
causing a display of the message within the moderator user interface.

15. A computer-readable storage device having encoded thereon computer-executable instructions to cause the one or more processing units of a system to perform a method comprising:
- determining an individual participation score for each of individual participants of a plurality of participants of a communication session, the individual participation score is calculated based on activity factors associated with each of the individual participants during the communication session including a number of attempts a participant of the plurality of participants has made to speak, a duration the participant has spoken, and a detected confidence level that is based on a detection of a predetermined gesture of the participant;
- determining an individual recommendation score for each of the individual participants of the communication session, the individual recommendation score for the participant is based on a combination of an individual participation score for the participant, a topic familiarity score for the participant, and a timing score for the participant, wherein the timing score is based on a time of an input indicating an intent to speak, wherein the topic familiarity score is based on a metric of historical activity related to a topic;
- causing a display of a moderator user interface comprising an ordered list of participants of the communication session, wherein the participants are ordered in accordance with individual recommendation scores for each individual in the ordered list; and
- receiving an input from a moderator having permissions for causing a computing device associated with the participant to receive presentation permissions, the presentation permissions permitting the computing device associated with the participant in the ordered list to share content with the computing devices of other participants of the communication session.

16. The computer-readable storage medium of claim 15, wherein individual representations of each participant in the ordered list further comprises a recommendation element for providing notice of a recommendation to change the order of the participant in the ordered list, the recommendation to change the order of the participant being based on behavioral characteristics of the participant, the behavioral characteristics including a time in which the participant has spoken in the meeting, wherein the recommendation for the participant is to lower the priority of the participant if the participant has spoken for more than a threshold amount of time.

17. The computer-readable storage medium of claim 15, wherein individual representations of each participant in the ordered list further comprises a recommendation element for providing notice of a recommendation to change the order of the participant in the ordered list, the recommendation to change the order of the participant being based on characteristics of the participant, the characteristics including a threshold match of a level of knowledge of the participant for a topic and a topic associated with the communication session.

18. The computer-readable storage medium of claim 15, wherein the method further comprises:
- determining and effectiveness score based on at least one of a completeness score for an agenda or a team participation score; and
- generating a graphical element conveying a value of the effectiveness score.

19. The computer-readable storage medium of claim 18, wherein the team participation score is based on a variance, wherein the variance decreases the team participation score if collective activity of a number of participants does not meet one or more criteria with respect to a meeting type, wherein a reduction of the team participation score reduces the effectiveness score.

20. The computer-readable storage medium of claim 15, further comprising:
- generating a message for influencing the flow of a meeting based on a team participation score; and
- causing a display of the message within the moderator user interface.

* * * * *